(12) United States Patent
Irving et al.

(10) Patent No.: US 6,868,231 B2
(45) Date of Patent: Mar. 15, 2005

(54) IMAGING USING SILVER HALIDE FILMS WITH MICRO-LENS CAPTURE AND OPTICAL RECONSTRUCTION

(75) Inventors: Lyn M. Irving, Rochester, NY (US); Richard P. Szajewski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/167,794

(22) Filed: Jun. 12, 2002

(65) Prior Publication Data

US 2003/0231880 A1 Dec. 18, 2003

(51) Int. Cl.[7] .................. G03B 41/00; G03B 17/00; G03B 5/00; G02B 27/10; G03C 1/46
(52) U.S. Cl. .................. 396/322; 396/440; 355/67; 430/21; 430/396; 430/434; 430/503; 430/506; 359/626
(58) Field of Search .................. 396/332, 330, 396/306, 435, 307, 305, 440, 322, 333, 316, 317, 337, 340, 439, 544, 72, 114, 121, 326, 327; 430/396, 496, 383, 501, 503, 506, 510, 523, 539, 434, 403, 311, 504, 236, 212, 50, 13, 265, 596, 946, 220, 228, 66, 91, 14, 21, 244, 394, 443, 219; 359/621–623, 626, 205, 847, 849, 819, 820; 355/53, 67, 71, 77, 52; 352/43, 85

(56) References Cited

U.S. PATENT DOCUMENTS

| | | | |
|---|---|---|---|
| 992,151 A | 5/1911 | Berthon | 396/307 |
| 1,746,584 A | 2/1930 | Fournier | 396/307 |
| 1,749,278 A | 3/1930 | Frederick | 396/306 |
| 1,824,353 A | 9/1931 | Jensen | 359/455 |
| 1,838,173 A | 12/1931 | Chretien | 355/132 |
| 1,849,036 A | 3/1932 | Ernst | 355/77 |

(List continued on next page.)

FOREIGN PATENT DOCUMENTS

| | | |
|---|---|---|
| JP | 05-145857 | 6/1993 |
| JP | 08-125933 | 5/1996 |
| JP | 2001-147466 | 5/2001 |

OTHER PUBLICATIONS

Edward M. Crane and C. H. Evans, "Devices for Making Sensitometric Exposures on Embossed Kinescope Recording Film" Jan. 1958, pps. 13–16, Journals of the SMPTE vol. 67.

J.S. Courtney–Pratt, "Lenticular Plate Multiple Picture Shadowgraph Recording", Sep. 1961, pps. 710–715, Journal of the SMPTE, vol. 70.

C.H.Evans and R.B. Smith, "Color Kinescope Recording on Embossed Film" Jul., 1956, pps. 365–372, Journal of the SMPTE, vol. 65.

Rudolf Kingslake, "The Optics of the Lenticular Color–Film Process", Jan. 1958, pps. 8–13, Journal of the SMPTE, vol. 67.

(List continued on next page.)

*Primary Examiner*—Judy Nguyen
*Assistant Examiner*—Rochelle Blackman
(74) *Attorney, Agent, or Firm*—Roland R. Schindler, II

(57) ABSTRACT

Methods and apparatii are provided that use a photosensitive element that is photosensitive to light within a predetermined range of exposure levels to capture images including exposure levels that are outside of the predetermined range of exposure levels. The photosensitive element is exposed to light from a scene. The light from the scene is fractured into concentrated and residual portions with the concentrated portions being directed to form a pattern of concentrated image elements on the photosensitive element when light from the scene is within a first exposure range with the residual portion of the light being directed to form a residual image when light from the scene is within a second exposure range. The light from the scene is adapted also so that the pattern of concentrated image elements is formed in a predefined pattern of concentrated image areas on the photosensitive element.

39 Claims, 25 Drawing Sheets

U.S. PATENT DOCUMENTS

| | | | |
|---|---|---|---|
| 1,942,841 A | 1/1934 | Shimizu | 359/455 |
| 1,985,731 A | 12/1934 | Ives | 352/81 |
| 2,143,762 A | 1/1939 | Carstaff | 430/396 |
| 2,144,649 A | 1/1939 | Eggert et al. | 430/396 |
| 2,191,038 A | 2/1940 | Capstaff | 430/15 |
| 2,252,006 A | 8/1941 | Holst et al. | 355/90 |
| 2,304,988 A | 12/1942 | Yule | 355/77 |
| 2,316,644 A | 4/1943 | Yule | 359/489 |
| 2,407,211 A | 9/1946 | Yule | 355/77 |
| 2,455,849 A | 12/1948 | Yule | 355/132 |
| 2,691,586 A | 10/1954 | Yule et al. | 430/596 |
| 2,992,103 A | 7/1961 | Land et al. | 430/245 |
| 3,413,117 A | 11/1968 | Gaynor | 430/13 |
| 3,506,350 A | 4/1970 | Denner | 355/40 |
| 3,905,701 A | 9/1975 | David | 355/71 |
| 3,954,334 A | 5/1976 | Bestenreiner et al. | 355/52 |
| 3,973,953 A | 8/1976 | Montgomery | 430/50 |
| 3,973,954 A | 8/1976 | Bean | 430/50 |
| 3,973,957 A | 8/1976 | Montgomery | 430/50 |
| 3,973,958 A | 8/1976 | Bean | 430/50 |
| 4,040,830 A | 8/1977 | Rogers | 430/212 |
| 4,272,186 A | 6/1981 | Plummer | 355/34 |
| 4,458,002 A | 7/1984 | Janssens et al. | 430/236 |
| 4,483,916 A | 11/1984 | Thiers | 430/236 |
| 5,464,128 A | 11/1995 | Keller | 222/333 |
| 5,554,251 A * | 9/1996 | Watanabe et al. | 156/379.8 |
| 5,610,390 A | 3/1997 | Miyano | 250/216 |
| 5,649,250 A | 7/1997 | Sasaki | 396/333 |
| 5,744,291 A | 4/1998 | Ip | 430/504 |
| 6,014,232 A | 1/2000 | Clarke | 358/482 |
| 6,016,185 A * | 1/2000 | Cullman et al. | 355/52 |
| 6,167,206 A * | 12/2000 | Hylen | 396/316 |
| 2003/0231255 A1 * | 12/2003 | Szajewski et al. | 348/340 |

OTHER PUBLICATIONS

Furukawa, et al., "A 1/3–inch 380K Pixel (Effective) IT–CCD Image Sensor", Jun. 5, 1992, pps. 595–600, IEEE, vol. 38, No. 3.

Deguchi et al., "Microlens Design Using Simulation Program For CCD Image Sensor", Jun. 5, 1992, pps. 583–589, IEEE, vol. 38, No. 3, Aug. 1992.

* cited by examiner

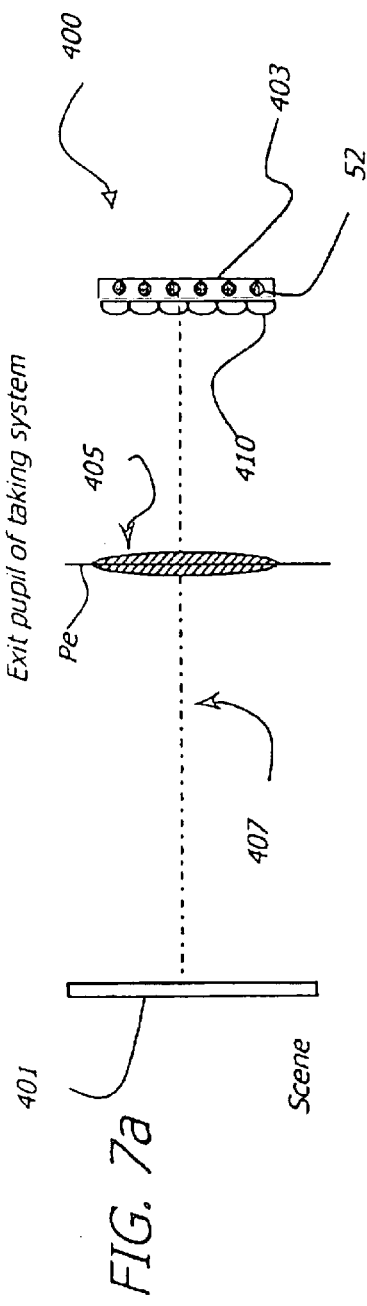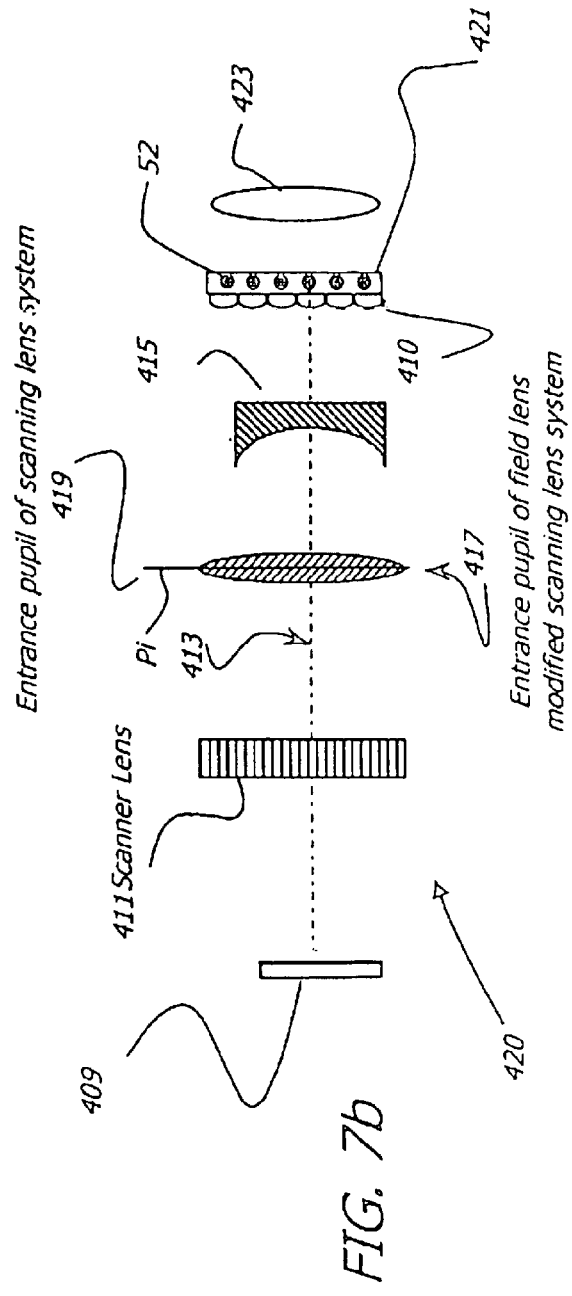

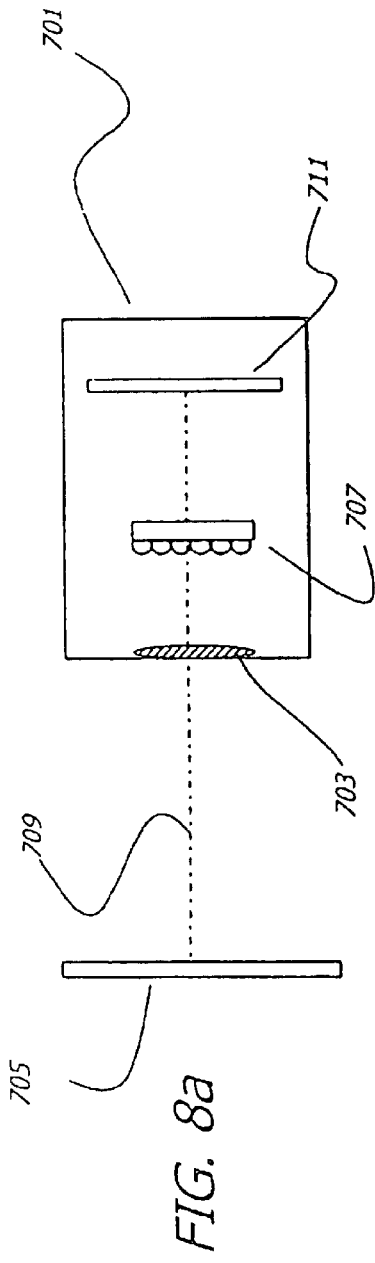
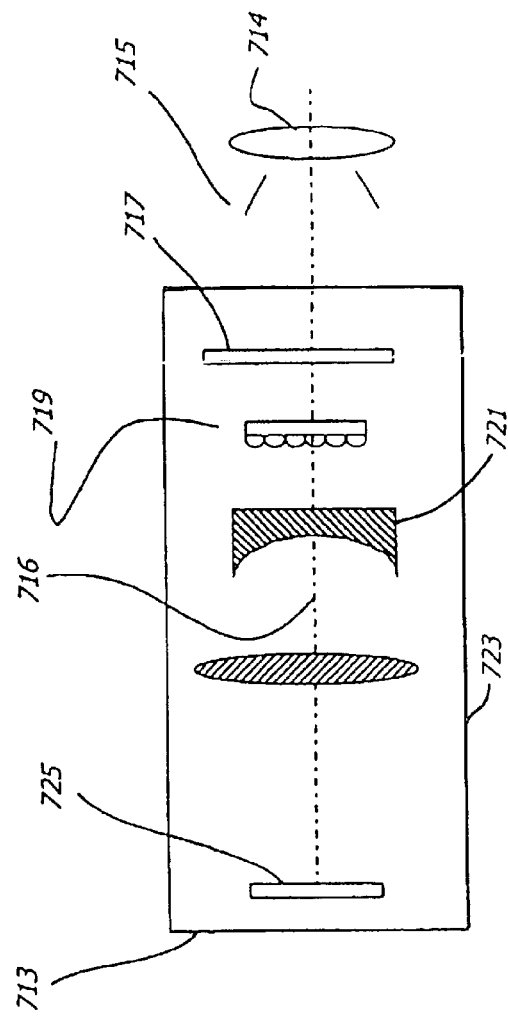
FIG. 8a
FIG. 8b

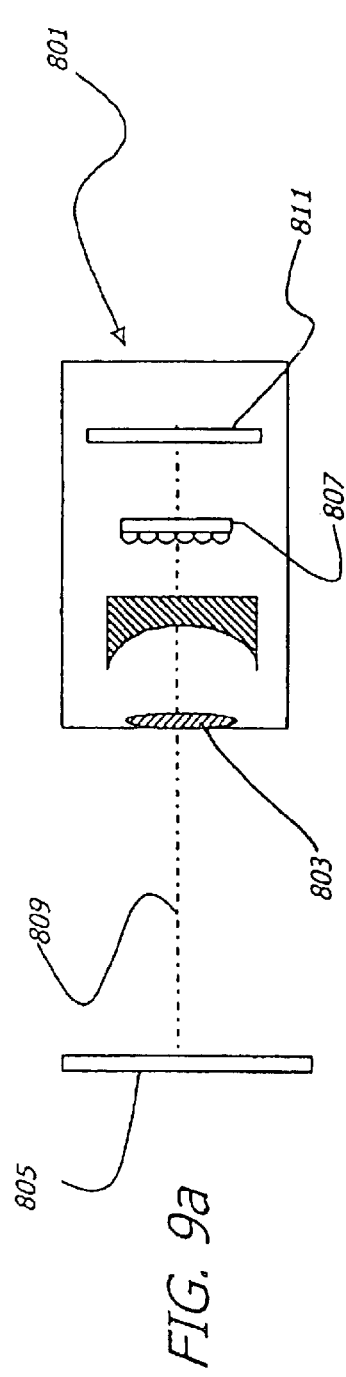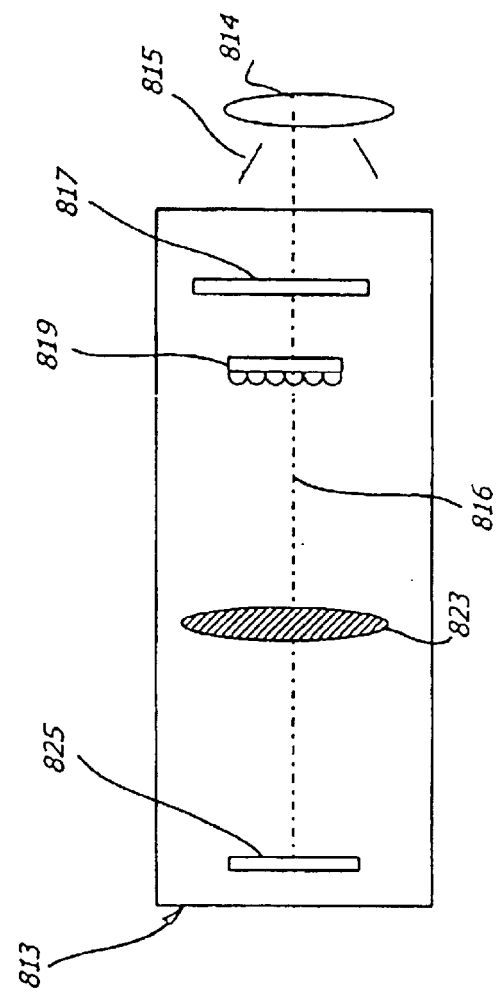

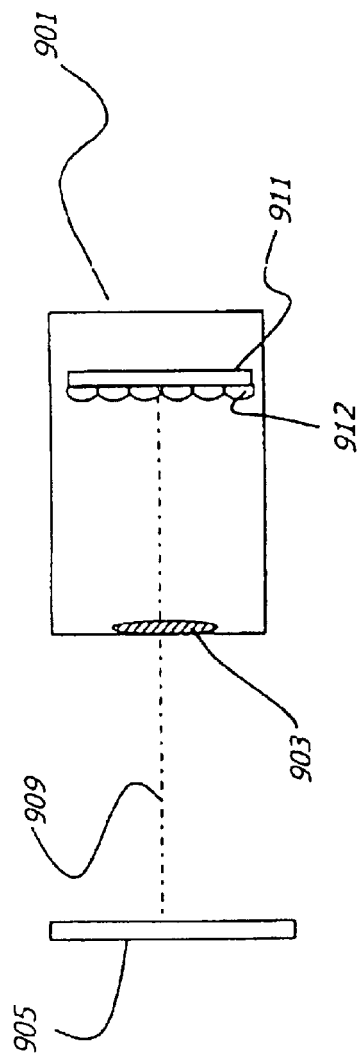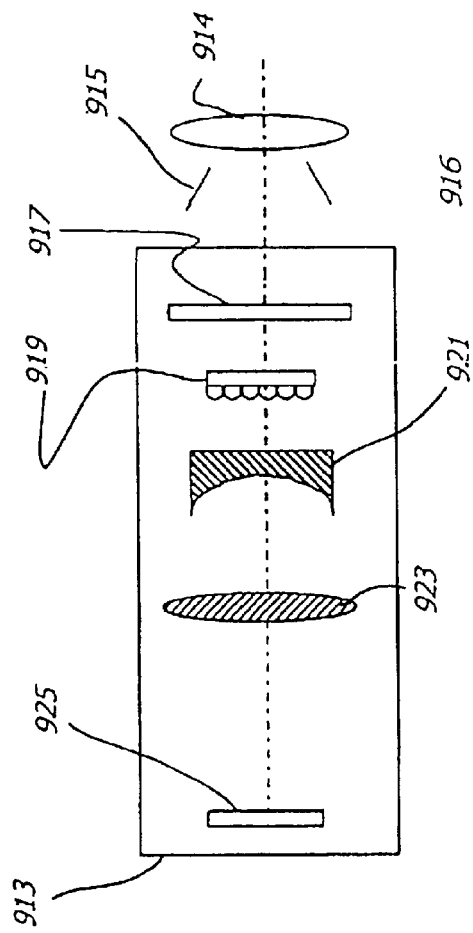
FIG. 10a
FIG. 10b

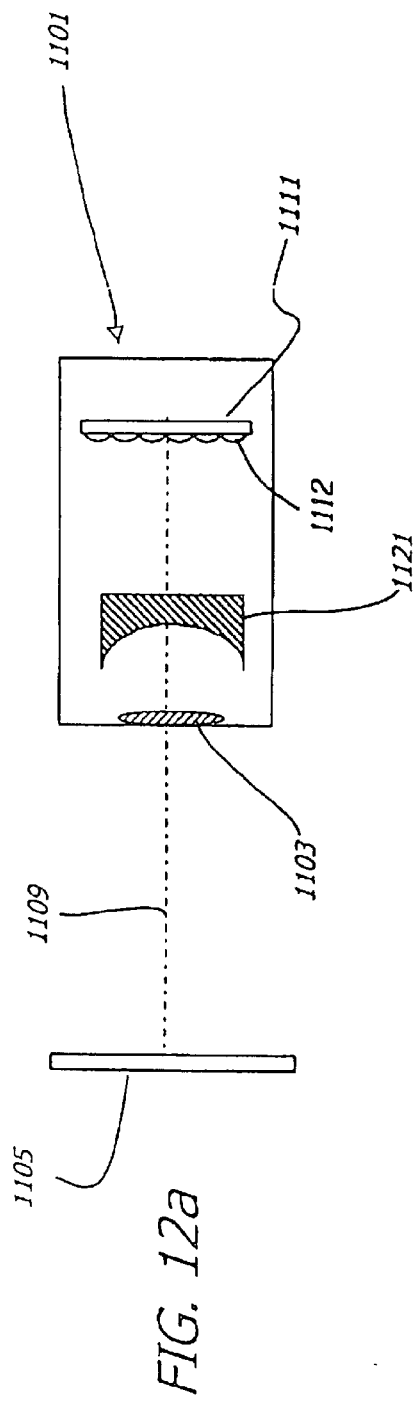
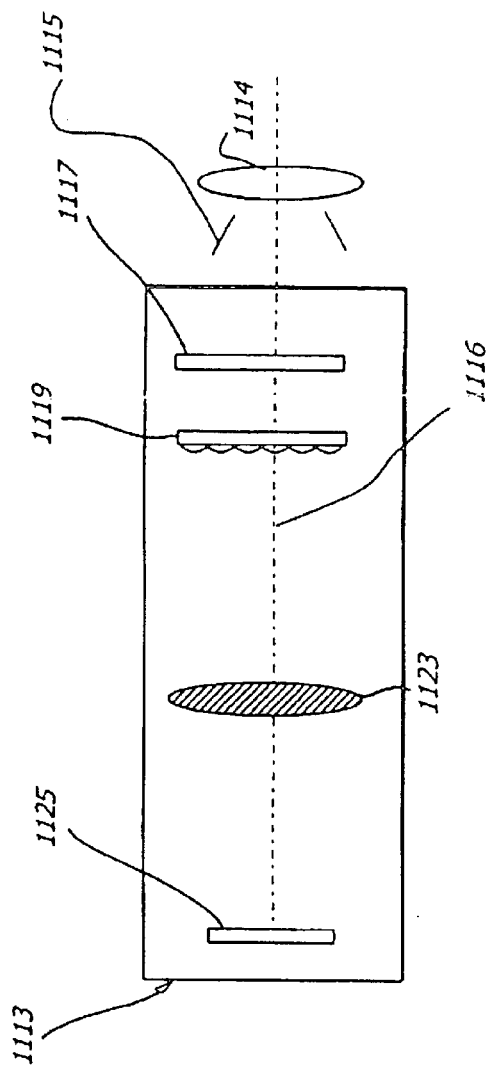

IMAGING USING SILVER HALIDE FILMS WITH MICRO-LENS CAPTURE AND OPTICAL RECONSTRUCTION

CROSS-REFERENCE TO RELATED APPLICATIONS

This application is being filed as on of a group of five co-filed and commonly assigned U.S. patent applications Ser. No. 10/170,607 filed herewith, entitled CAMERA SPEED COLOR FILM WITH BASE SIDE MICRO-LENSES, in the names of Lyn Irving and Richard Szajewski; U.S. patent application Ser. No. 10/171,012, entitled LENTICULAR IMAGING WITH INCORPORATED BEADS, in the names of Krishnan Chari, Lyn Irving and Richard Szajewski; U.S. patent application Ser. No. 10/167,746, entitled CAMERA SPEED COLOR FILM WITH EMULSION SIDE MICRO-LENSES, in the names of Richard Szajewski and Lyn Irving and U.S. patent application Ser. No. 10/170,148, entitled IMAGING USING SILVER HALIDE FILMS WITH MICRO-LENS CAPTURE, SCANNING AND DIGITAL RECONSTRUCTION, in the names of Richard Szajewski and Lyn Irving, the contents of which are incorporated herein by reference.

FIELD OF THE INVENTION

The present invention relates to the field of photosensitive element based photography and more particularly to methods and apparatii for using a photosensitive element that is photosensitive to light within a predetermined range of exposure levels to capture images including exposure levels that are outside the predetermined range.

BACKGROUND OF THE INVENTION

In conventional photography, it is well known to record images by controllably exposing a photosensitive element to light from a scene. Typically, such a photosensitive element comprises one or more photosensitive layers supported by a flexible substrate such as film and/or a non-flexible substrate such as a glass plate. The photosensitive layers, which can have one or more light sensitive silver halide emulsions along with product appropriate imaging chemistry, react to the energy provided by the light from the scene. The extent of this reaction is a function of the amount of light received per unit area of the element during exposure. The extent of this reaction is greater in areas of the element that are exposed to more light during an exposure than in areas that are exposed to less light. Thus, when light from the scene is focused onto a photosensitive element, differences in the levels of light from the scene are captured as differences in the extent of the reaction in the layers. After a development step, the differences in the extent of the reaction in the layers appear as picture regions having different densities. These densities form an image of the original scene luminance.

It is characteristic of silver halide emulsions to have a non-linear response when exposed to ambient light from a scene. In this regard a photosensitive element has a lower response threshold that defines the minimum exposure at which the incorporated emulsions and associated chemistry begins to react so that different levels of exposure enable the formation of different densities. This lower threshold ultimately relates to the quantum efficiency of individual silver halide emulsion grains. Typically, all portions of a photosensitive element that are exposed to light at a level below the lower response threshold have a common appearance when the photosensitive element is developed.

Further, a photosensitive element also has an upper response threshold that defines the exposure level below which the emulsion and associated chemistries react so that different levels of exposure enable the formation of different densities. Typically, all portions of an element that are exposed at a level above the upper response threshold will again have a common appearance after the photosensitive element is developed.

Thus photosensitive elements that use silver halide emulsions can be said to have both a lower response threshold and an upper response threshold which bracket a useful range of exposures wherein the photosensitive element is capable of reacting to differences in exposure levels by recording a contrast pattern with contrast differences that are differentiable. The exposure levels associated with these lower and upper thresholds define the exposure latitude of the photosensitive element. To optimize the appearance of an image, therefore, it is typically useful to arrange the exposure so that the range of exposure levels encountered by the photosensitive element during exposure is within the latitude or useful range of the photosensitive element.

Many consumer and professional photographers prefer to use photosensitive elements, camera systems, and photography methods that permit image capture over a wide range of photographic conditions. One approach to meeting this objective is to provide photosensitive elements with extremely wide latitude. However, extremely wide latitude photosensitive elements are fundamentally limited by the nature of the response of the individually incorporated silver halide grains to light. Accordingly, it is common to provide camera systems and photography methods that work to effectively extend the lower response limit and upper response limit of a photosensitive element by modifying the luminance characteristics of the scene. For example, it is known to effectively extend the lower response limit of the photosensitive element by providing supplemental illumination to dark scenes.

It is also known to increase the quantity of the light acting on a photosensitive element without providing supplemental illumination by using a taking lens system designed to pass a substantial amount of the available light from the scene to the photosensitive element during an exposure. However, lenses that pass a substantial amount of light also inherently reduce the depth-of field of the associated camera system. This solution is thus not universally suitable for pictorial imaging with fixed focus cameras since scenes may not then be properly focused. This solution is also not preferred in variable focused cameras as such lens systems can be expensive, and difficult to design, install and maintain.

There is a direct relationship between the duration of exposure and quantity of light from the scene that strikes the photosensitive element during an exposure. Accordingly, another way known in the art for increasing the amount of light acting on a photosensitive element during an exposure is to increase the duration of the exposure using the expedient of a longer open shutter. This, however, degrades upper exposure limits. Further, increased shutter open time can cause the shutter to remain open for a period that is long enough to permit the composition of a scene to evolve. This results in a blurred image. Accordingly, there is a desire to limit shutter open time.

Thus, what is also needed is a less complex and less costly camera system and photography method allowing the capture of images using conventional shutter open times and particularly with cameras having a fixed shutter time.

Another way to increase the quantity of the light acting on a photosensitive element during an exposure is to use a conventional taking lens system to collect light from a scene and to project this light from the scene onto an array of micro-lenses such as an array of linear lenticular lenses that are located proximate to the photosensitive element. An example of this is shown in Chretien U.S. Pat. No. 1,838, 173. Each micro-lens concentrates a portion of the light from the scene onto associated areas of a photosensitive element. By concentrating light in this manner, the amount of light incident on each concentrated exposure area of the photosensitive element is increased to a level that is above the lower response threshold of the film. This permits an image to be formed by contrast patterns in the densities of the concentrated exposure areas.

Images formed in this manner are segmented: the concentrated exposure areas form a concentrated image of the scene and remaining portions of the photosensitive element form a pattern of unexposed artifacts intermingled with the concentrated image. In conventionally rendered prints of such images this pattern has an unpleasing low contrast and a half-tone look much like newspaper print.

However, a recognizable image can be obtained from such segmented images by projection under quite specific conditions. These conditions occur precisely when the spatial relationship between the effective camera aperture, the micro-lens array and the light sensitive element established at exposure in the camera is reproduced in the projector. This system can be cumbersome because a functional real image is produced at a position and magnification dictated by the original scene to camera lens arrangement. If a projection lens identical to the camera taking lens is positioned so as to mimic the camera lens to image relationship that existed at image taking, the reconstructed image will appear at the position of the original object with the size of the original object. Other lens and spatial relationship combinations result in incomplete image reconstruction and the formation of the dots and lines reminiscent of newspaper print. Thus, the micro-lens or lenticular assisted low light photography of the prior art is ill suited for the production of prints or for use in high quality markets such as those represented by consumers and professional photographers.

Micro-lens arrays, and in particular, lenticular arrays have found other applications in photography. For example, in the early days of color photography, linear lenticular image capture was used in combination with color filters as means for splitting the color spectrum to allow for color photography using black and white silver halide imaging systems. This technology was commercially employed in early color motion picture capture and projection systems as is described in commonly assigned U.S. Pat. No. 2,191,038. In the 1940s it was proposed to use lenticular screens to help capture color images using black and white photosensitive element in instant photography U.S. Pat. No. 2,922,103. In the 1970's, U.S. Pat. No. 4,272,186 disclosed the use of lenticular arrays to create images having increased contrast characteristics. By minimizing the size of the unexposed areas, the line pattern became almost invisible and was therefore less objectionable. Also in the 1970s, it was proposed to expose photosensitive element through a moving lenticular screen U.S. Pat. No. 3,954,334. Finally, in the 1990's linear lenticular-ridged supports having three-color layers and an antihalation layer were employed for 3-D image presentation materials. These linear lenticular arrays were used to form interleaved print images from multiple views of a scene captured in multiple lens camera. The interleaved images providing a three dimensional appearance. Examples of this technique is disclosed by Lo et al. in U.S. Pat. No. 5,464,128 and by Ip, in U.S. Pat. No. 5,744, 291. It is recognized that these disclosures relate to methods, elements and apparatus adapted to the formation of 3-D images from capture of multiple scene perspectives that are suitable for direct viewing. They fail to enable photography with shutter times suitable for use in hand-held cameras.

Thus, while micro-lens assisted photography has found a variety of uses, it has yet to fulfill the original promise of effectively extending the lower response threshold of a photosensitive element to permit the production of commercially acceptable prints from images captured at low scene brightness levels. What is needed, therefore, is a method and apparatus for capturing lenticular images on a photosensitive element and using the captured photosensitive element image to form a commercially acceptable print or other output.

It can also occur that it is useful to capture images under imaging conditions that are above the upper response threshold of the photosensitive element. Such conditions can occur with bright scenes that are to be captured under daylight, snow pack and beach situations. Typically, cameras use aperture control, shutter timing control and filtering systems to reduce the intensity of light from the scene so that the light that confronts the photosensitive element has an intensity that is within the upper limit response of the photosensitive element. However, these systems can add significant complexity and cost to the design of the camera. Further, the expedient of using a lens with a more open aperture to improve the lower threshold limit as discussed earlier simultaneously passes more light and degrades the exposure at the upper response threshold. Thus, what is also needed is a simple, less costly, camera system and photography method for capturing images over a range of exposure levels including exposure levels that are greater than the upper response limit of the photosensitive element.

SUMMARY OF THE INVENTION

According to a feature of the invention, a method is provided for using a photosensitive element that is photosensitive to light within a predetermined range of exposure levels to capture images including exposure levels that are outside of the predetermined range of exposure levels. In accordance with the method, the photosensitive element is exposed to light from a scene. The light from the scene is fractured into concentrated and residual portions with the concentrated portions being directed to form a pattern of concentrated image elements on the photosensitive element when light from the scene is within a first exposure range with the residual portion of the light being directed to form a residual image when light from the scene is within a second exposure range. The light from the scene is adapted also so that the pattern of concentrated image elements is formed in a predefined pattern of concentrated image areas on the photosensitive element.

According to another feature of the invention a method is provided for forming an output image from a photoprocessed photosensitive element having at least one of pattern of concentrated image elements displaced from a predefined pattern of concentrated image areas. In accordance with the method, a light is modulated by the photoprocessed photosensitive element. The modulated light is decompressed to extract an image from the modulated light. The decompressed image is adapted so that the adapted and decompressed image has the appearance of an image formed from light modulated by a pattern of concentrated image elements that are placed within the predefined pattern of concentrated image areas. The adapted decompressed image is focused at an imaging plane.

In still another feature of the invention, a camera is provided for forming at least one image on a photosensitive element that is photosensitive to light within a predetermined range of exposure levels to capture images including exposure levels that are outside of the predetermined range of exposure levels. The camera has a gate positioning the photosensitive element. A taking lens unit focuses light from the scene at the photosensitive element. A shutter controllably exposes the photosensitive element to light from the scene. An array of micro-lenses is positioned between the field lens and the photosensitive element. The array of micro-lenses directing a first portion of light from the scene to form a pattern of concentrated image elements on the photosensitive element when the exposure includes light that is within a first range of exposure levels and with the array of micro-lenses permitting a second portion of light from the scene to pass to the photosensitive element and form a residual image surrounding the concentrated image elements when light from the scene is within a second range of exposure levels, wherein the combination of the first range of exposures and the second range exposure levels and the second range of exposure levels is greater than the pre-defined range of exposure levels. A field lens is disposed between the taking lens unit and the array of micro-lenses, with the field lens adapting light from the scene so that the pattern of concentrated image elements is formed in a predefined pattern of concentrated image areas on the photosensitive element.

In a further aspect of the invention, a reader apparatus is provided for forming an output image using a photoprocessed photosensitive element having at least one of a pattern of concentrated image elements and a residual image recorded. The reader includes a light source radiating light and a gate positioning the photoprocessed photosensitive element to modulate light radiated by the light source. A micro-lens array decompresses light modulated by a predetermined pattern of concentrated image element areas on the photoprocessed photosensitive element. The predetermined pattern differs from the pattern actually formed on the photoprocessed photosensitive element. A lens unit receives the decompressed light and forms an output image at an imaging plane. A field lens is positioned between the array of micro-lenses and the lens unit. The field lens adapts the decompressed light so that the output image contains an image that is based upon the pattern of concentrated image elements actually formed on the photoprocessed photosensitive element.

BRIEF DESCRIPTION OF THE DRAWINGS

FIGS. 7a and 7b illustrate the use of a field lens for adjusting a lens pupil in a scanner.

FIGS. 8a–8b illustrate an image forming system employing a distinct micro-lens array in both a camera and a reader with a field lens positioned in the printer.

FIGS. 9a–9b illustrate of an image forming system employing a distinct micro-lens array in both a camera and a reader with a field lens positioned in the camera.

FIGS. 10a–10b illustrate an image forming system employing a temporary film integral micro-lens array in a camera with a distinct micro-lens array and a field lens in a reader.

FIGS. 12a–12b illustrate an image forming system employing a temporary film integral micro-lens array and a field lens in a camera with a micro-lens array in a reader.

DETAILED DESCRIPTION OF THE INVENTION

This invention is related to photography apparatii and photography methods that extend the effective image capture latitude of a photosensitive element.

Image Capture

Figure 1:
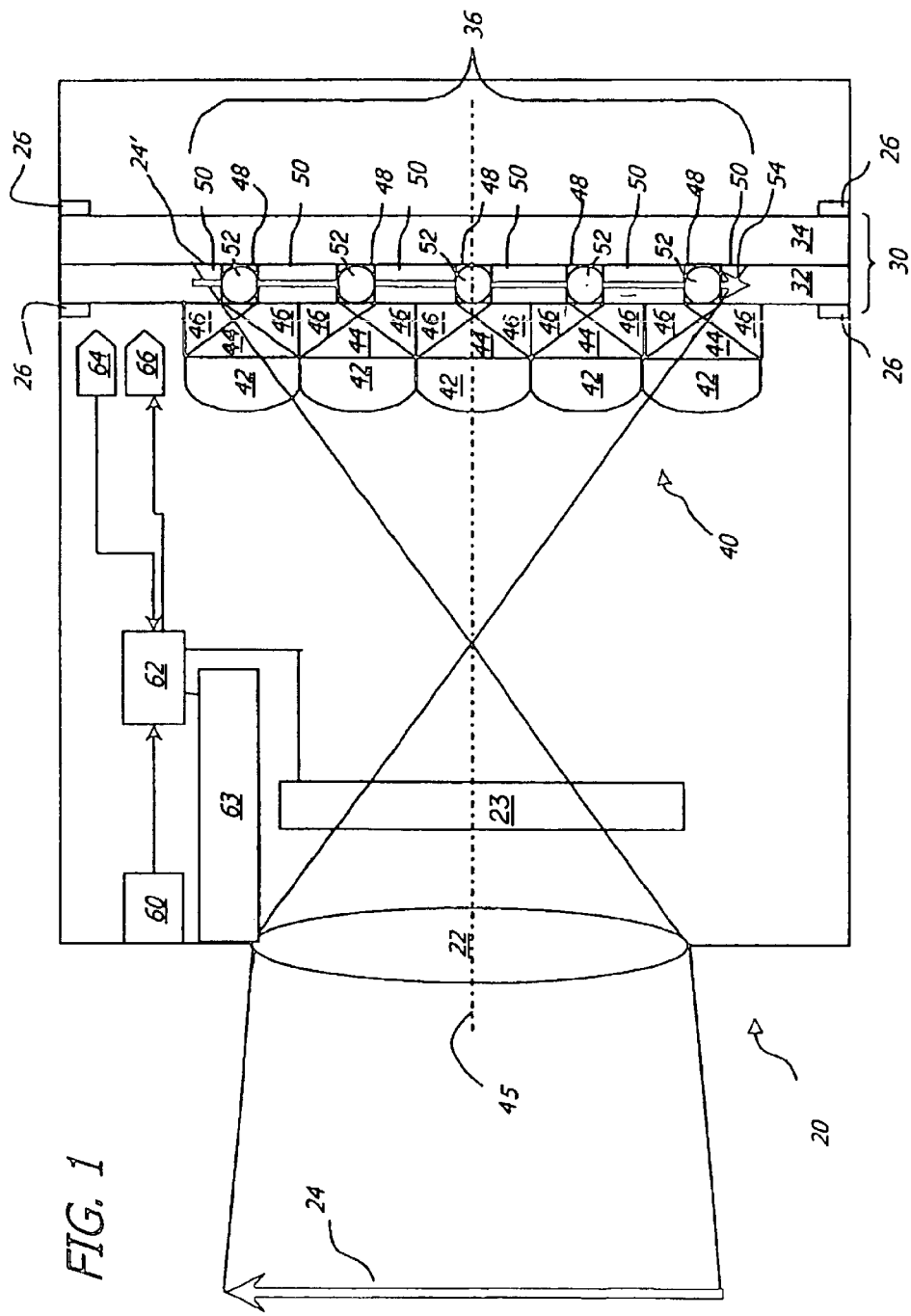
FIG. 1 shows a schematic view of one embodiment of a camera according to the invention.

FIG. 1 shows a diagram useful in describing the operation of one embodiment of a camera 20 for forming an image on a photosensitive element 30 comprising a photosensitive layer 32 and a substrate 34. In the embodiment of FIG. 1, camera 20 includes a body 21 having an aperture 23 to admit light from a scene 24 into body 21. A taking lens system 22 directs light from a scene 24 along optical axis 45 toward a gate 26 that positions photosensitive element 30 at a defined distance from taking lens system 22 during exposure. Preferably, the depth of focus of the taking lens system 22 is such that an image of scene 24' is formed on an imaging area 36 of the photosensitive layer 32 with image of scene 24' having a consistent focus across the imaging area 36.

Interposed between taking lens system 22 and photosensitive element 30 is a micro-lens array 40 having a plurality of micro-lenses 42. Each of the micro-lenses 42 in micro-lens array 40 receives a portion of the light passing from the taking lens system 22 and fractures this light into a concentrated fraction 44 and a residual fraction 46. Each of the concentrated fractions 44 are concentrated onto associated concentrated image areas 48 of photosensitive element 30 and each residual fraction 46 passes to an associated residual image area 50 of photosensitive element 30. The effect of fracturing is shown conceptually in FIG. 1 and will now be described with reference to FIGS. 1 and 2a, 2b and 2c. A shutter system 27 is disposed between aperture 23 and micro-lens array 40. Shutter system 27 controllably permits light from the scene to expose photosensitive element 30 for a predefined period of time.

Figure 2A:
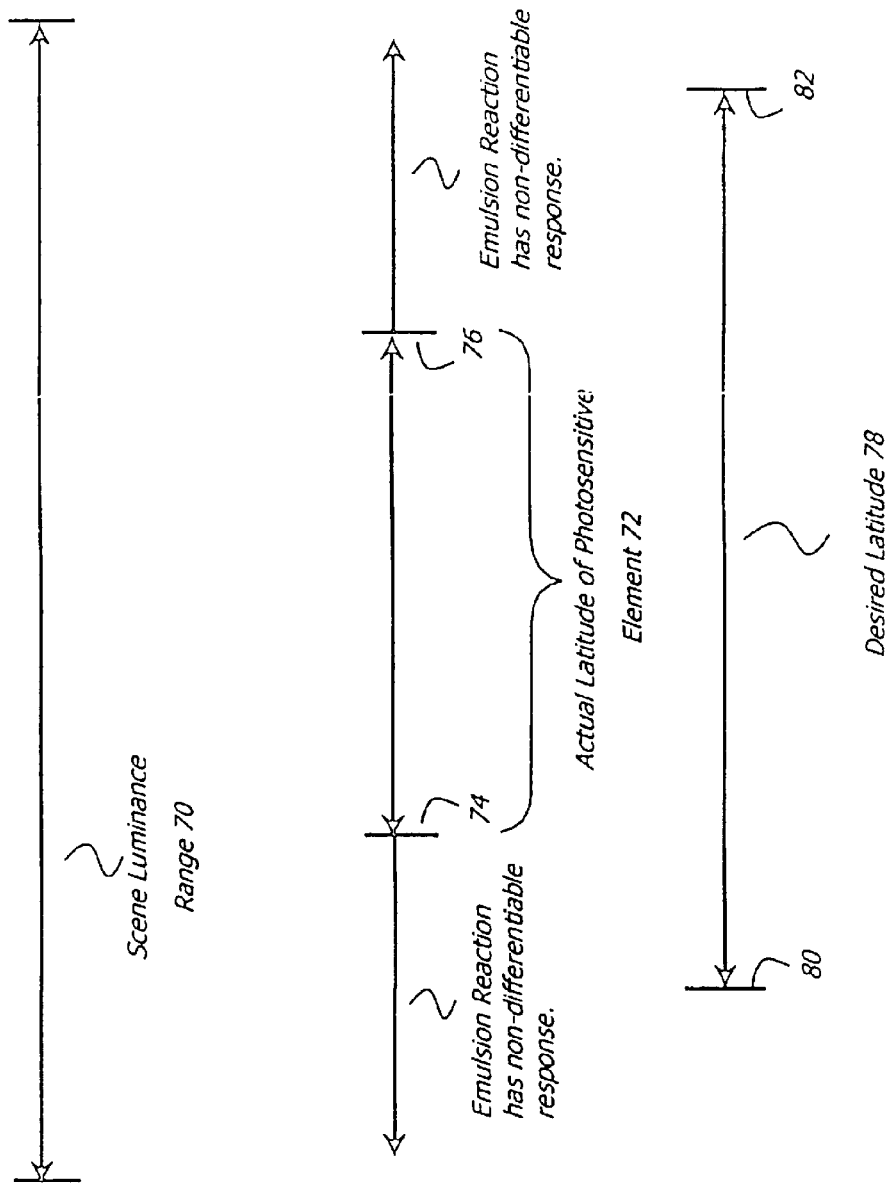
FIG. 2a is a diagram useful in describing the relationship between scene exposure actual latitude and effective latitude.

As is shown in FIG. 2a, light from a photographic scene extends, over a wide range of scene luminances. In the case of available light photography, these are the luminances that are visually observable by humans. This range is indicated in FIG. 2a as scene luminance range 70. However, photosensitive element 30 has an actual latitude 72 within which the photosensitive element 30 can capture differences in scene illumination and record a contrast image of the scene. Because of the inherent limitations of chemical image capture technology and the specific non-linear response of the photosensitive element 30 to illumination from the scene, the actual latitude 72 of photosensitive element 30 is defined by a lower response threshold 74 and an upper response threshold 76. Photosensitive element 30 does not differentiably react to scene illumination differences when photosensitive element 30 is exposed to quantities of light that are lower than the lower response threshold 74. As noted above, this is because the energy made available by such limited quantities of light is not sufficient to cause the emulsion and associated chemistries to react to form a differentiable exposure record. Accordingly, all portions of the photosensitive element 30 that are exposed to such quantities of light have a generally light appearance when photosensitive element 30 is photoprocessed.

Similarly, photosensitive element 30 does not differentiably react to scene illumination differences when photosensitive element 30 is exposed to quantities of light that are higher than the upper response threshold 76. As noted in greater detail above, this is because the amount of light received by the photosensitive element 30 above upper response threshold 76 is sufficient to drive the chemical reaction of the emulsions and associated chemistries a point wherein photosensitive element 30 no longer has a meaningful additional density response to additional light energy. Because of this, all portions of photosensitive element 30 that are exposed to such quantities of light have a generally dark appearance when photosensitive element 30 is photoprocessed.

It is appreciated that the terms light and dark are appropriate for negative working photosensitive materials such as print films intended for use with negative working papers or for scanning. With positive working photosensitive materials such as reversal slide films and direct print films, the recited areas would be respectively dark and light in characteristic.

Any known photosensitive material formulation can be used to prepare a photosensitive element 30 useful in the practice of the invention. Elements having excellent light sensitivity are best employed in the practice of this invention. The elements should have a sensitivity of at least about ISO 25, preferably have a sensitivity of at least about ISO 100, and more preferably have a sensitivity of at least about ISO 400. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number pH 2.27–1981 (ISO (ASA Speed)) and relates specifically the average of exposure levels required to produce a density of 0.15 above the minimum density in each of the green light sensitive and least sensitive color recording unit of a color film. This definition conforms to the International Standards Organization (ISO) film speed rating. For the purposes of this application, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

While standard photographic elements can be employed in this invention, the elements most useful in this invention are designed for capturing an image in machine readable form rather than in a form suitable for direct viewing. In the capture element, speed (the sensitivity of the element to low light conditions) is usually critical to obtaining sufficient image in such elements. Accordingly, the elements, after micro-lens speed enhancement will typically exhibit an equivalent ISO speed of 800 or greater, preferable an equivalent ISO speed of 1600 or greater and most preferably an equivalent ISO speed of 3200 or greater. The elements will have a latitude of at least 3.0 log E, and preferably a latitude of 4.0 log E, and more preferable a latitude of 5.0 log E or even higher in each color record Such a high useful latitude dictates that the gamma of each color record (i.e. the slope of the Density vs log E after photoprocessing) be less than 0.70, preferably less than 0.60, more preferably less than 0.50 and most preferably less than 0.45. Further, the color interactions between or interimage effects are preferably minimized. This minimization of interimage effect can be achieved by minimizing the quantity of masking couplers and DIR compounds. The interimage effect can be quantified as the ratio of the gamma of a particular color record after a color separation exposure and photoprocessing divided by the gamma of the same color record after a white light exposure. The gamma ratio of each color record is preferably between 0.8 and 1.2, more preferably between 0.9 and 1.1 and most preferably between 0.95 and 1.05. Further details of the construction, characteristics quantification of the performance of such scan enabled light sensitive elements and are disclosed in Sowinski et al. U.S. Pat. Nos. 6,021,277 and 6,190,847, the disclosures of which are incorporated by reference.

Figure 2B:
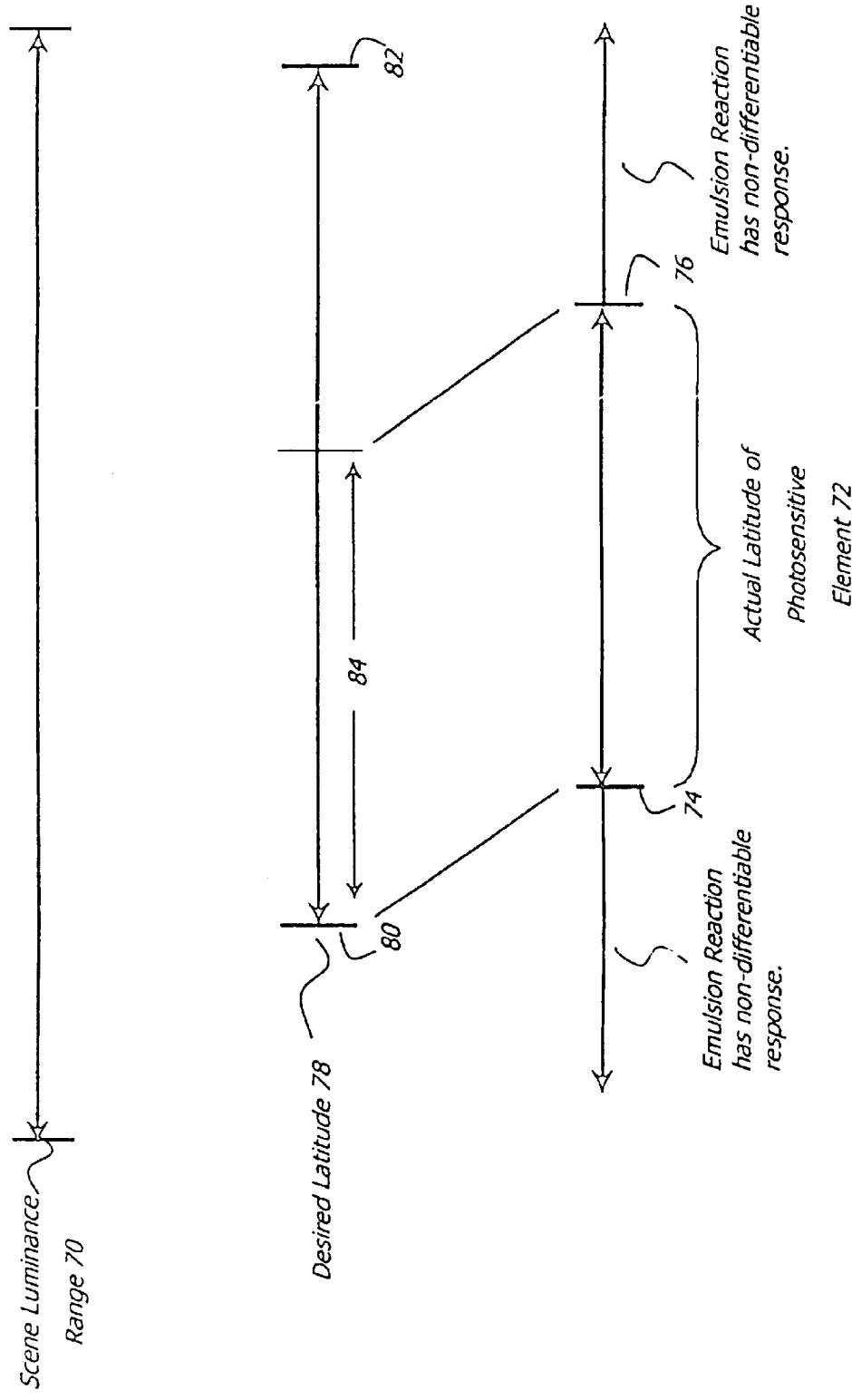
FIG. 2b is a diagram useful in describing the effect of concentrated light on a photosensitive element.

As is also shown in FIG. 2a, it is desirable that camera 20 and photosensitive element 30 should record scene information at a desired lower response threshold of desired latitude 80 that is lower than the response threshold 74 of photosensitive element 30. In accordance with the principles of the present invention, photography in this range of illumination is made possible by concentrating light from the scene. In this regard, each of the micro-lenses 42 in micro-lens array 40, fractures light from the scene into at least two portions. As is shown in FIG. 1, a concentrated fraction 44 of light from scene 24 is concentrated so that a greater amount of light per unit area falls upon each of the concentrated image areas 48 of photosensitive element 30 during an exposure than would fall upon concentrated image areas 48 in the absence of the micro-lens array 40 of micro-lenses 42. As is shown in FIG. 2b, this increase in the amount of light incident upon concentrated image areas 48 has the effect of shifting a first exposure range 84 of scene exposure levels so that the entire first exposure range 84 is within the actual latitude of photosensitive element 72. This shift allows a pattern of concentrated image elements 52 to form a concentrated image in the concentrated image areas 48 of photosensitive element 30.

Incidentally, some of the light incident on micro-lenses 42, for example, light that is poorly focused by micro-lenses 42 or light that passes between distinct ones of micro-lenses 42 is not focused on concentrated image areas 48. Instead, this residual fraction 46 of the light passes to photosensitive element 30 and is incident on residual image area 50 enabling formation of a residual image 54. Residual image 54 can further be formed by designed or adventitious light scatter and reflection in photosensitive element 30. This residual fraction 46 is less than the amount of light that would be incident on photosensitive element 30 in the event that micro-lens array 40 of micro-lenses 42 was not interposed between the scene 24 and the photosensitive element 30 during the same exposure. Thus, micro-lenses 42 effectively filter light from the scene that is incident on residual image area 50 so that a greater quantity of light must be available during the exposure in order for a residual image 54 to be formed on photosensitive element 30. Accordingly, the predefined period of time that shutter system 27 permits for exposure of photosensitive element 30 is sufficient to form an image on the residual image area 50 of the photosensitive element when light from the scene is within a second range.

Figure 2C:
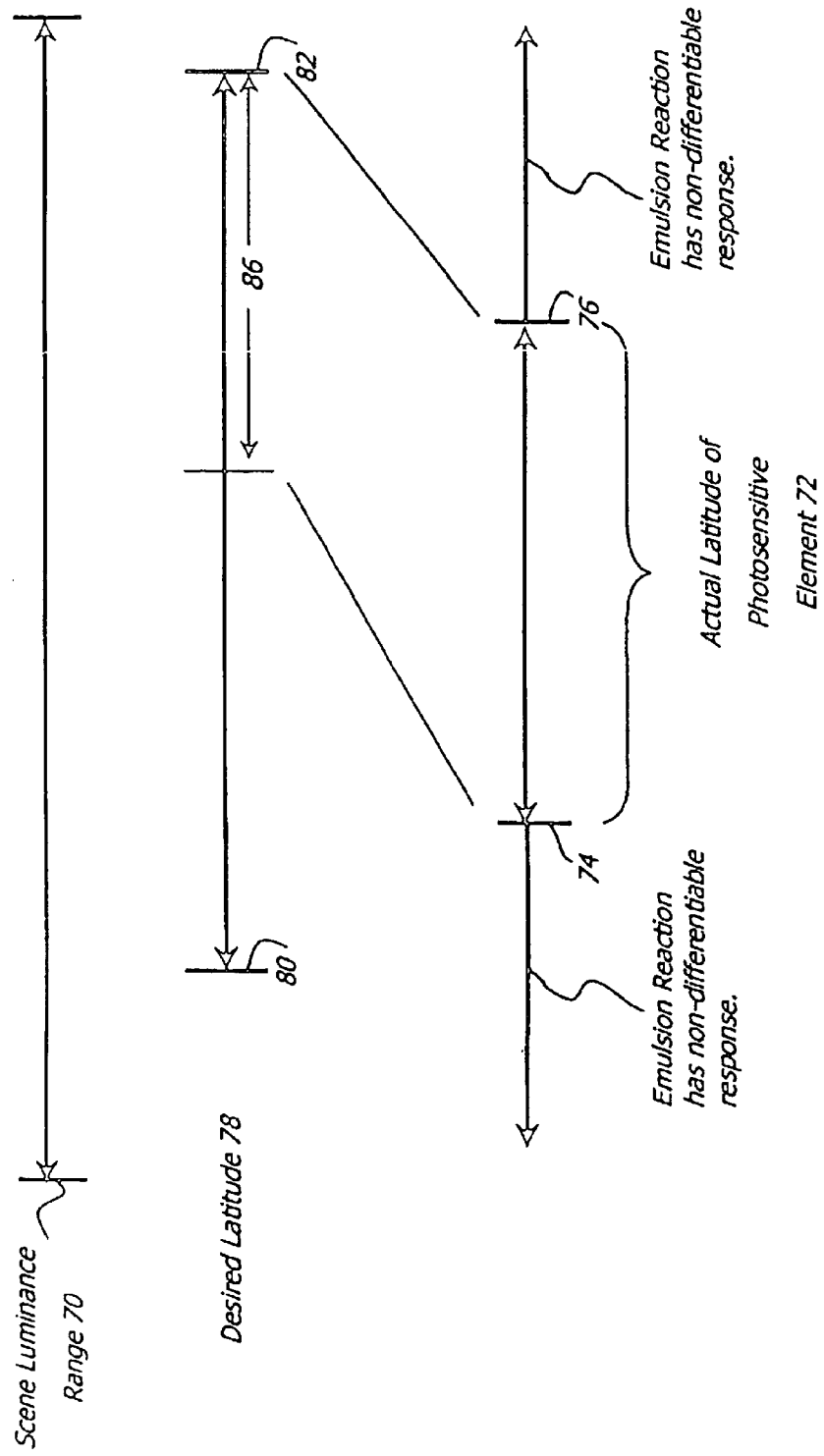
FIG. 2c is a diagram useful in describing the effect of residual light on the photosensitive element.

Accordingly, as is shown in FIG. 2c, when the micro-lenses 42 of micro-lens array 40 are exposed to light within a second exposure range 86, a second exposure suitable for producing an image over the range indicated by second exposure range 86 is formed on photosensitive element 30 in the residual image area 50. In this way, photosensitive element 30 can be used to record differentiable images at exposure levels that are above the upper response threshold 76 of photosensitive element 30 but below desired upper response threshold of desired latitude 82.

A region of overlap can be defined between the first exposure range 84 and second exposure range 86. Where it is desired to greatly increase system latitude desired for photographic element 78, this region of overlap can be contracted. In a preferred embodiment, the ability to capture image information from either of the concentrated image elements 52 or residual image elements 54 over a continuous desired latitude desired for photographic element 78 is ensured by defining a substantial range of exposures wherein first exposure range 84 and second exposure range 86 overlap. Alternatively, it may be preferred to provide a camera 20 wherein there is little overlap or even substantial separation between first exposure range 84 and second exposure range 86. Camera 20 having such a substantial separation would effectively operate to capture different images under very different imaging conditions such as daylight and interior light.

It will be appreciated that when an exposure level is in the second exposure range 86, concentrated image elements 52 are formed on element 30. The concentrated image elements 52 formed during exposure in the second exposure range 86 can contain useful imaging information where the first exposure range 84 and second exposure range 86 at least partially overlap. However, where the exposure is above the first exposure range 84 then the concentrated image elements 52 will appear as over exposed artifacts in residual image 54 formed in the residual image area 50.

It will be further appreciated that while this discussion has been framed in terms of a specific embodiment directed towards silver halide photography intended for capturing human visible scenes the invention can be readily applied to capture extended scene luminance ranges and spectral regions invisible to humans and the photosensitive element 20 can use any light sensitive material known to the art that has the requisite imaging characteristics. The effective increase in sensitivity enabled can be at least 0.15 log E. In certain embodiments, the effective increase in sensitivity can be between at least 0.3 log E and 0.6 log E. In another embodiment, the effective increase in sensitivity is at least 0.9 log E.

Concentrated Image Element Displacement in Captured Image

Figure 3:
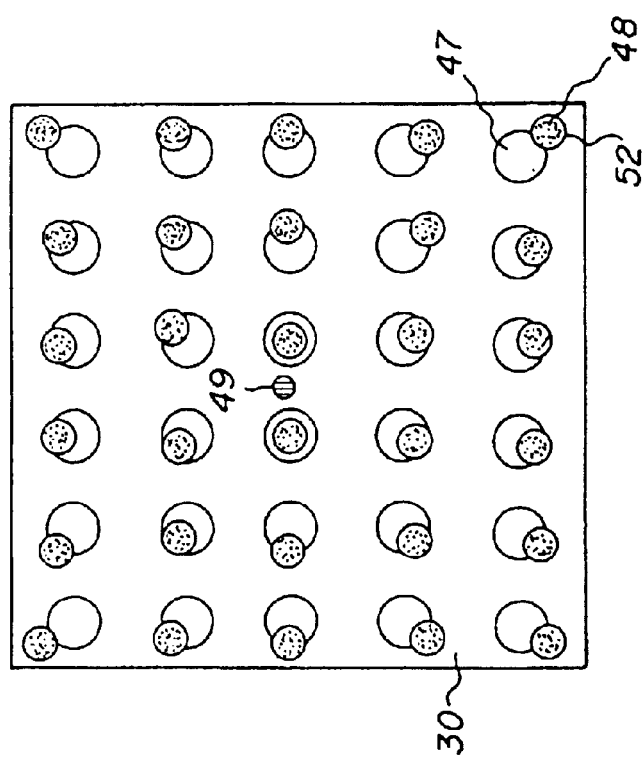
FIG. 3 shows a pattern of dots formed behind a square packed micro-lens array.

FIG. 3 shows an exposure pattern formed on photosensitive element 30 during imagewise exposure through a regular square array of spherical micro-lenses 42. Also shown in FIG. 3 is the intersection 49 of optical axis 45 and photosensitive element 30 that is established when photosensitive element 30 is mounted in a camera 20 and exposed through taking lens system 22. Expected image areas 47 are the direct on-axis projections of the individual micro-lenses 42 onto photosensitive element 30. As can be seen in FIG. 3, the further that the individual expected image areas 47 are from the intersection of optical axis and photosensitive element 49, the larger the displacement between the expected image areas 47 and the actual image areas 48. The extent of the displacement of the concentrated image elements 52 from the expected image areas 47 is controlled by the optical characteristics of the camera 20, taking lens system 22, and the micro-lenses 42. To provide an output image that has an acceptable appearance compensation for this displacement is required.

Figure 4:
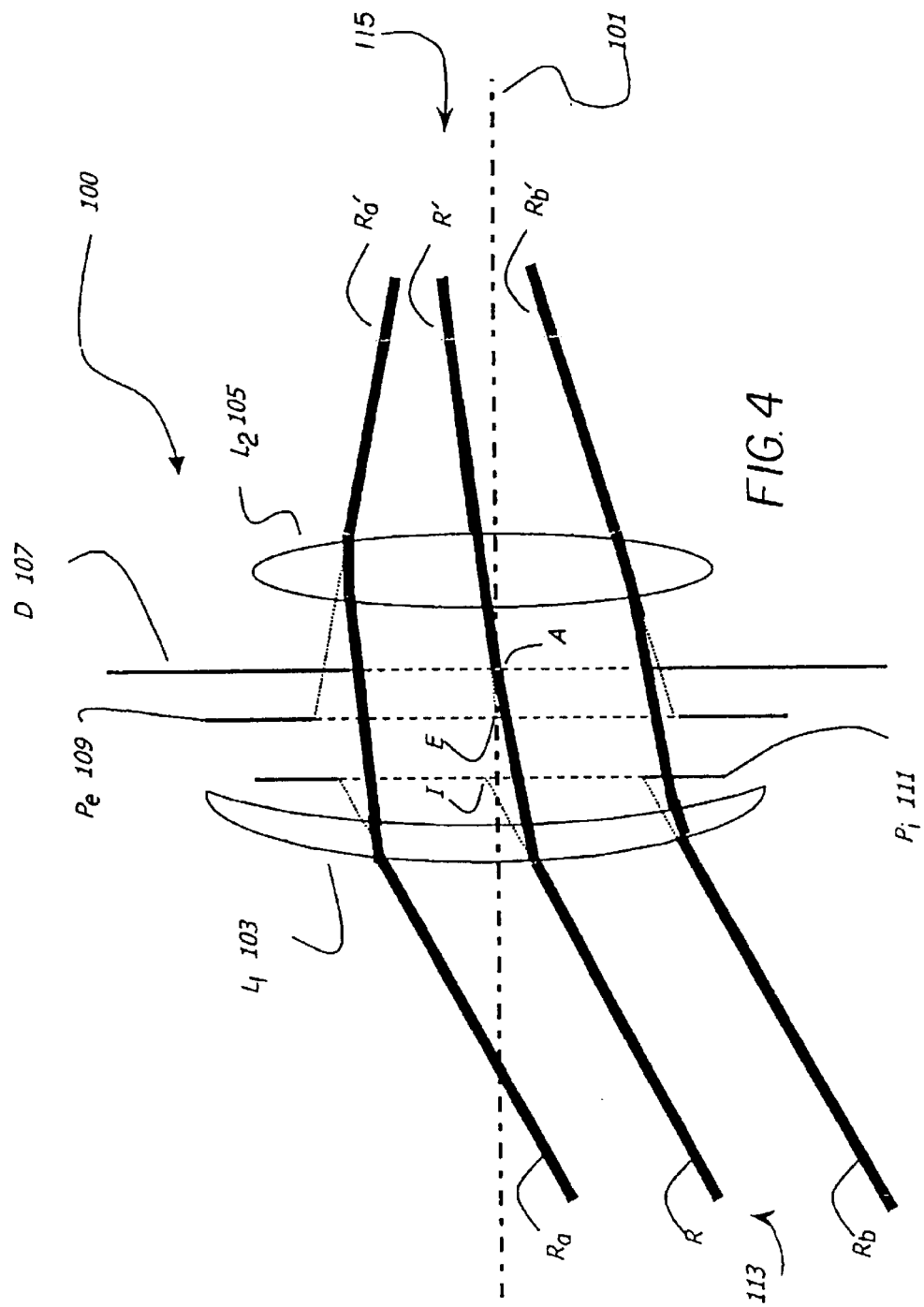
FIG. 4 illustrates the entrance and exit pupils of a lens system.

The source of this displacement will now be described with reference to FIG. 4. FIG. 4 shows an optical system 100 having optical components ($L_1$) 103 and ($L_2$) 105 with an interposed diaphragm (D) 107 shown for purposes of explanation. This system provides an optically effective aperture pupil. The real aperture of the diaphragm 107 limits the beams of light passing through optical system 100. The plane of the diaphragm 107 intersects the optical axis 101 of the optical system at point A. The optical components 103 of the system in front of diaphragm 107 form a virtual image of the stop at the entrance pupil $P_i$ in plane 111. Entrance pupil $P_i$ is such that prolongation of the parallel image rays 113 (principal ray R, and peripheral rays $R_a$ and $R_b$) through prolongation of parallel image rays 103 which afterwards are just bounded by the diaphragm 107 define the outline of the entrance pupil $P_i$. The diameter of the entrance pupil $P_i$ is thus equal to the effective aperture of the diaphragm.

The plane 111 of the entrance pupil $P_i$ intersects the optical axis 101 of the optical system 100 at point I. In like manner the optical components 105 of the system behind diaphragm 107 form a virtual image of diaphragm 107 at the exit pupil $P_e$ in plane 109. The exit pupil $P_e$ is such that prolongation of the focused rays 115 (principal ray R', and peripheral rays $R_a'$ and $R_b'$) through optical components $L_2$ 105 which afterwards are just bounded by diaphragm 107 define the outline of the exit pupil $P_e$. The plane of exit pupil $P_e$ intersects the optical axis 101 of optical system 100 at point E. The ratio of the exit pupil $P_e$ diameter to the entrance pupil $P_i$ diameter is known as the pupil magnification. For most normal lens systems the ratio of the exit pupil $P_e$ diameter to the entrance pupil $P_i$ diameter is between 0.85 and 1.15, for telephoto lenses it may be between 0.4 and 0.85 and for wide angle lenses it may be between 1.10 and 2.0.

The pupil magnification can also depend on the orientation of optical components 105 with respect to the image plane. The principal ray R-R' is shown as being originally directed from the scene towards point I and received at the image plane apparently from point E. When diaphragm 107 is placed with its center at the optical center of optical system 100, as frequently happens with symmetrical lens systems, the centers of the pupils coincide with the nodal points, but this coincidence does not occur with single lenses, convertible lenses, telephoto lenses and such. While the definition of pupils has been presented with respect the a multi-lens optic, it will be readily apparent the pupil positions can be likewise defined for the simpler optics found in fixed focus cameras and for the more complex optics found in projectors, optical printers, scanners and the like. Indeed, with some lens systems, the entrance pupil $P_i$ and the exit pupil $P_e$ can be identical.

The following definitions follow from the above description and are useful explaining the source of displacement of concentrated image elements 52 as described above:

Entrance Pupil $P_i$—the image of the diaphragm as seen from object space.

Exit Pupil $P_e$—the image of the diaphragm as seen from image space.

Graphic identification of entrance and exit pupils. The entrance pupil can generally be located graphically by identifying the bundle of parallel rays from a particular angle that will pass through the optical system. Extend the ray in the center of this bundle from the object toward the optical lens system. This ray intersects the optical axis at the location of the entrance pupil. The exit pupil can be located graphically by extending this same light ray backwards towards the optical system from the image to the point where the ray intersects the optical axis. The intersection defines the location of the exit pupil.

f-number—The expression denoting the ratio of the equivalent focal length of a lens to the diameter of its entrance pupil.

Numerical Aperture (NA)—The sine of the vertex angle of the largest cone of meridional rays that can enter or leave an optical system or element, multiplied by the refractive index of the medium in which the vertex of the cone is located, generally measured with respect to an object or image point, and will vary as that point is moved. The entrance NA of a lens system, relative to an object point, can thus differ from the exit NA, relative to an image point, of the same lens system. Generally, as follows from geometric optics, the numerical aperture (NA) of the projection or taking lens is equivalently given by the inverse of twice the working f-number of that lens.

It is apparent that the only light rays that emerge from a lens system perpendicular to an imaging plane (at $R'_a$—$R'$—$R'_b$) and image symmetrically about an optical axis 101 are those from a scene symmetrically disposed about the same lens axis. Since the micro-lenses 42 in the current system are using the output of taking lens system 22 as their scene, the only micro-lenses 42 that receive a symmetrically disposed scene are those having their individual micro-lens axes coincident with the axis of taking lens system 22. As the axes of the micro-lenses 42 are more and more displaced from the optical axis 45 of taking lens system 22, the areas imaged by the micro-lenses 42 are more and more displaced, just as illustrated at FIG. 3.

Accordingly, changing the spatial and angular relationship between exit pupil $P_e$ of the taking lens system 22 in camera 20 and photosensitive element 30 modifies the regions of photosensitive element 30 that are exposed through micro-lenses 42. Qualitatively the on-axis micro-lenses 42 produce an on-axis image while all off-axis micro-lenses 42 produce concentrated image element 52 that are displaced relative to the optical axes of the individual micro-lenses 40. As noted above, the off axis displacement of concentrated image elements 52 can cause the appearance of an uncorrected output image that is rendered based on the concentrated image elements 52 to be poor. Likewise, changing the entrance pupil $P_e$ of projector lens will affect the regions of the micro-lens exposed and photoprocessed photosensitive element 30 that are captured by the projection lens system. In this regard, it is possible to define an optical system of a reader device so that the spatial and angular relationship of the optic system of the reader and photosensitive element 30 match the spatial and angular relationship of the scene and the photosensitive element 30 at the time of image capture. This system can be cumbersome because a functional real image is produced at a position and magnification dictated by the original scene to camera lens arrangement. If a projection lens identical to the camera taking lens is positioned so as to mimic the camera lens to image relationship that existed at image taking, the reconstructed image will appear at the position of the original object with the size of the original object. Other lens and spatial relationship combinations result in incomplete image reconstruction, improper de-skewing of the image areas/or the formation of the dots and lines reminiscent of newspaper print. This level of image quality is generally inferior to that expected by the modern user of photographic materials.

It will be appreciated therefore, that in order to obtain the benefits of using micro-lens array 40 of micro-lenses 42 to extend the effective latitude of photosensitive element 30, it is necessary to compensate for the effects of skew in another way.

The following sections describe various embodiments of systems that compensate for skew so that an acceptable image can be formed based upon the concentrated image elements 52. Later sections describe various embodiments of systems that compensate for skew so an acceptable image can be formed from the residual image area 50.

Forming an Image Using Concentrated Image Elements

In accordance with the present invention, the pattern of concentrated image elements 52 that is recorded in concentrated image areas 48 of an image formed on a photosensitive element 30 using a micro-lens assisted photography is reconstructed to form an output image that has an acceptable appearance. The reconstruction process involves decompressing and adapting the optical image to form an image at an imaging plane that has an acceptable appearance. In accordance with the present invention, decompression and adapting are performed optically. This advantageously permits conventional optical photofinishing equipment to be readily adapted to process photosensitive elements that have images that were recorded on a film using micro-lens assisted photography.

Figure 5:
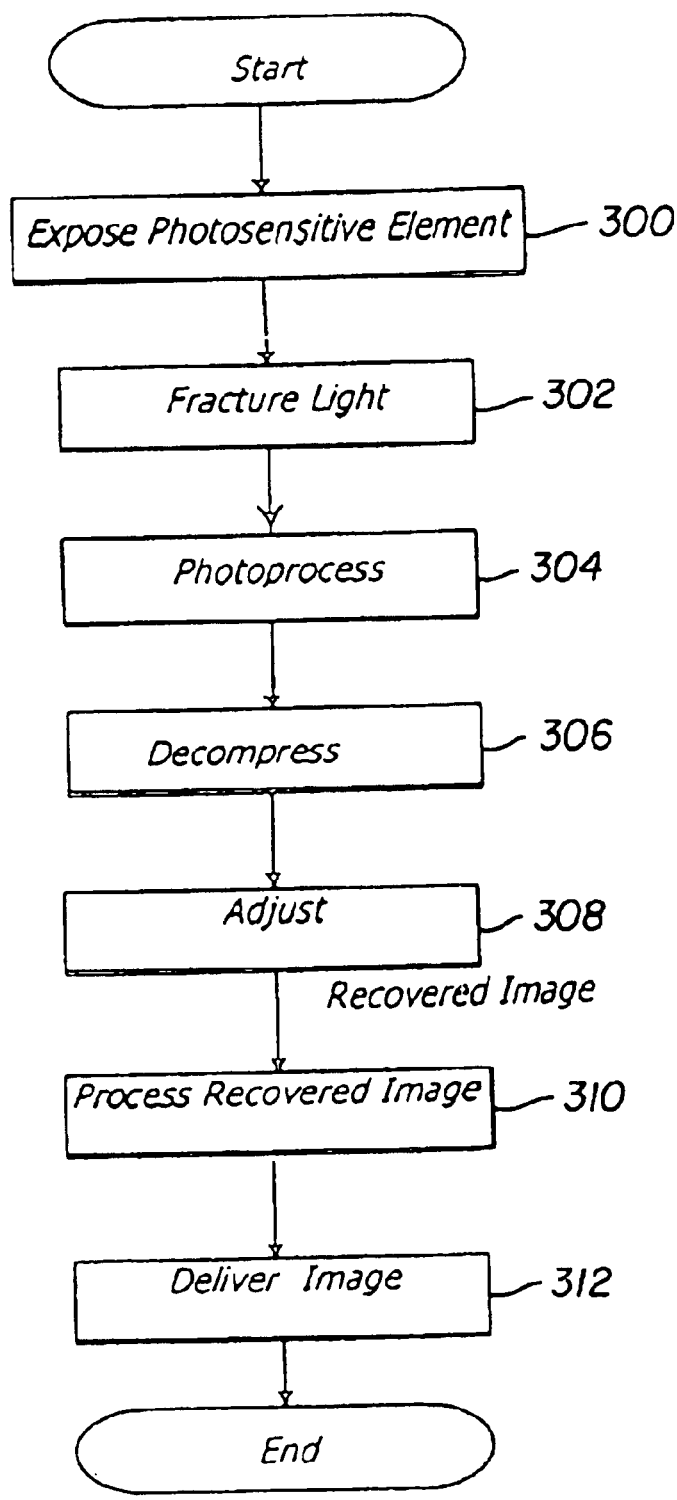
FIG. 5 shows one embodiment of a photography method in accordance with the present invention.

FIG. 5 shows a flow diagram of one embodiment of a method for using a photosensitive element 30 having a fixed exposure range to capture image information from scenes having a lower exposure range and for recovering an acceptable output image from the imaging information recorded on the photosensitive element 30. The first step in this process is that of exposing the photosensitive element to light from a scene. (step 300).

The light from the scene is fractured into a pattern of concentrated (or compressed) fractions and residual fractions. (step 302) As described above, the concentrated fractions of the light expose concentrated image areas 48 on the photosensitive element 30 and form a pattern of concentrated imaging elements 52 such as lines or dots on photosensitive element 30 after development. When the light from the scene is within first exposure range 84 a contrast image is formed in the concentrated image elements 52.

The photosensitive element 30 is then photoprocessed (step 304) to form the photoprocessed element 38. Any art known for photoprocessing can be employed. The photoprocessing can comprise a development step with optional desilvering steps. The photoprocessing can be done by contacting the photosensitive element with photoprocessing chemicals, conditions or agents enabling photoprocessing. The photoprocessing can be done by contacting the photosensitive element 30 with aqueous solutions of photoprocessing chemicals or pH adjusting agents or both. Alternatively, the photosensitive element can be photoprocessed using other techniques known in the art such as photothermographic processing wherein the photosensitive element 30 is photoprocessed by heating or by a combination of contacting with photoprocessing enabling agents and heat.

The compressed, developed image is then processed to recover an output image that can be made available to a scanner or printer or for viewing (not shown). The recovery process involves decompressing the image (step 306) by passing light back through the compressed image and micro-lens array 40. The recovery process also involves adapting the decompressed light to de-skew the image (step 308) using a field lens. The recovered image is optionally further processed as described below. (step 310) The output image is then delivered. (step 312).

The decompression and adapting steps (steps 306 and 308) will now be described in greater detail with reference to FIGS. 1, 4, 5, 6 and 7.

As previously mentioned, FIG. 1 shows a camera 20 having a taking lens 22, a light photosensitive element 30 and an interposed micro-lens array 40. Other camera elements such as a shutter and release, fixed or variable aperture stops, also known as diaphragms, film reels and advance mechanisms, viewfinders and such are omitted for clarity. An imagewise exposure in the camera 10 of FIG. 1, the interposed micro-lens array 40 acts to concentrate the light falling on specific portions of the photosensitive element 30 thus effectively increasing the system sensitivity of camera 20 while producing a compressed exposure pattern on the light sensitive element. The camera taking lens system 22 and the micro-lenses 42 of micro-lens array 40 jointly image a scene onto photosensitive element 30. Where micro-lens array 40 contains an array of circular micro-lenses 42 the light concentration or useful photographic speed gain on concentrating light with the micro-lens is the square of the ratio of the lens f-number of taking lens system 22 and the lens f-number of the micro-lenses 42. The speed gain (in log relative exposure) is twice the log of the ratio of f-number of the taking lens system 22 to the f-number micro-lenses 42. The concentration of light by the micro-lenses 42 of micro-lens array 40 thus enables a system speed gain. In the case of a regular square array of spherical micro-lenses 42 a dot pattern is formed on the photosensitive element 30. As will be described in greater detail below, other forms of micro lenses can be used.

Figure 6:
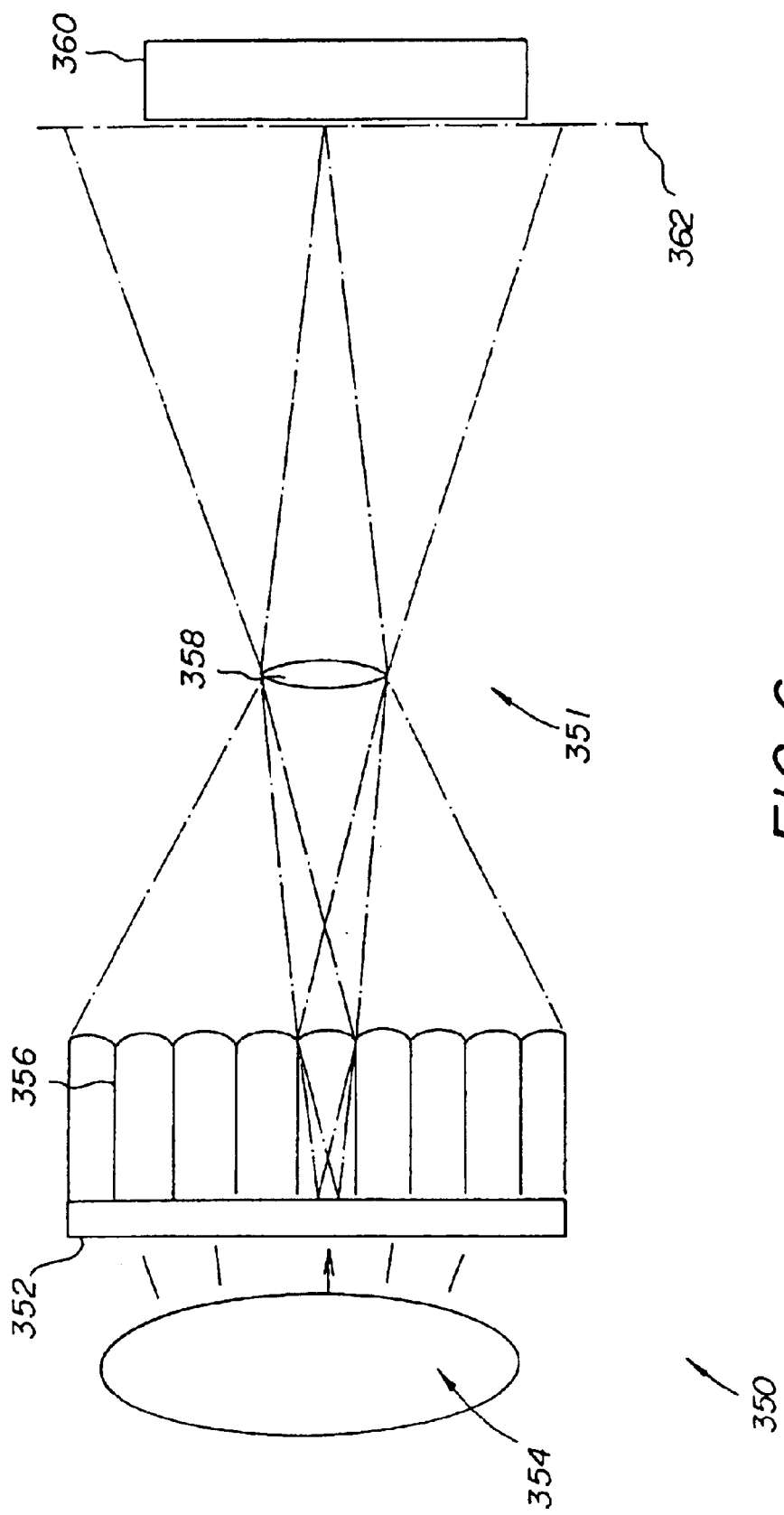
FIG. 6 shows one embodiment of a reader device that can be used in conjunction with an embodiment of a camera of the present invention.

In accordance with the present invention, both decompression (step 306) and adapting (step 308) are accomplished using optical image modification. By way of illustration FIG. 6 shows an embodiment of a reader device 350 of the prior art that derives an image from an exposure pattern of concentrated image elements 52 on a photoprocessed element 352. Reader device 350 has an optical system 351 that performs both the functions of adapting and decompressing an image recorded on photoprocessed element 352 by a camera system such as camera 20 of FIG. 1. In this embodiment, the reader device 350 has a diffuse light source 354. A photoprocessed element 352 having an exposure made by a camera 20 of the type shown in FIG. 1 is illuminated by light from light source 354. Image modulated light passes through a micro-lens array 356 and a projection lens 358 to form a projected image 360 of the original scene at an imaging plane 361.

It will be appreciated that the camera of FIG. 1 has been drawn with the exit pupil coincident with taking lens system 22 and that reader device 350 of FIG. 6 has also been drawn with the entrance pupil coincident with projection lens system 362. Each of the micro-lenses 42 in the taking system of FIG. 1 casts a concentrated portion of the light passed by the exit pupil of taking lens system 22 onto the concentrated image areas 48 of the photosensitive element 30. The concentrated light is splayed behind the individual micro-lens components to form concentrated image elements 52 as described above. As is described below, concentrated image elements 52 are splayed onto photosensitive element 30 in a manner dictated by the spatial and angular displacement of each of the micro-lenses 42 from the camera optical axis 45. In FIG. 6, photoprocessed element 352 has a pattern of concentrated image elements 52 that are projected back to form an optically reconstructed image of the original scene.

The reader device 350 shown in FIG. 6 is adapted to read images from a photoprocessed element 352 that has a micro-lens array 356 that is integral to a photoprocessed element 352. As will be described in greater detail below, other micro-lens arrangements can be employed. The reader device 350 of FIG. 6 optically decompresses the image as long as the identical spatial relationship between the effective camera aperture, the micro-lens array and the photosensitive element 352 established at exposure in the is reproduced when the image is read. This is so because micro-lens array 356, when used in reading mode, decompresses the image encoded in the pattern of compressed image elements 52 at the aperture position established when the pattern of compressed image elements 52 was formed, i.e. at the camera aperture. Thus, the skew introduced by using micro-lens array 356 in the camera 20 of FIG. 1 is compensated for by functionally running the camera backwards. However, as is often the case, where the spatial relationship between the effective camera aperture, micro-lens array 40 and photosensitive element 30 established at exposure in camera 20 of FIG. 1 cannot be efficiently reproduced and reader device 350 will present an image having an appearance that is degraded by skew.

In accordance with one embodiment of the present invention, a reader device such as the one shown in FIG. 6 is adapted with a field lens to correct the displacement of concentrated image elements 52 caused by skew. This field lens adjusts the optical path in a reader device to match the optical characteristics of a taking system. Effectively, the field lens shifts the spatial position of the lens aperture or pupil so as to enable the projection of a recorded scene at proper focus and with proper magnification at a useful site, for example the sensor plane of a scanner or to the paper plane in an optical printer. In another alternative embodiment, the taking system includes a field lens to adapt the image to de-skew the image at the capture stage so as to allow the formed dot or line image to be read out in a conventional scanner or optical print head. In an alternative embodiment, field lenses are incorporated into both the capture and readout systems and matched to combine to compensate for skew.

There are distinct paths for decompression and optical reconstruction of the concentrated images formed in camera 20. All require that the spatial relationship between the original scene, the taking pupil and the exposed-image be reproduced as a developed-image to readout pupil to reconstructed scene relationship. This coincidence of spatial relationship can be achieved by careful choice of lens and lens to subject/lens to object distances in both stages of a co-optimized taking—readout system. More generally, this coincidence of spatial relationship can be achieved by employing a field lens at the taking stage, at the reading stage or at both stages of the exposure—reading system.

It is appreciated that while the description of the decompression and adapting steps has been set forth with specific reference to using a field lens in a scanner, other placements of the field lens and the use of optical printers or direct viewers are fully contemplated. In various embodiments described below, the requirements for an optically reconstructed image are met by adding a field lens to a camera to move the camera exit pupil to match the position of the projection system entrance pupil, both with respect to the micro-lens array. Where adapting is performed on the taking side, the reader of FIG. 6 can be used without a field lens.

Various embodiments of these systems will be described in greater detail below. However, the optical conditions that can be used for adapting and decompression can be described numerically. In this regard, the following definitions are useful design considerations for such a system:

Focal Point—That point on the optical axis of a lens, to which an incident bundle of parallel light rays will converge.

Focal Length—The effective focal length (EFL) is the distance from a principal point to a corresponding focal point. The front focal length (FFL) is the distance from the front lens surface to the front (first) focal point. The back focal length (BFL) is the distance from the back lens surface to the back (second) focal point.

Principal Plane—In a lens or lens system, that surface at which the projections of an entering and exiting ray intersect. Also known as the equivalent refracting surface, the principal plane is most often not actually a plane but rather a curved surface.

Principal Point—The intersection of the principal plane and the optical axis of a lens.

A lens system typically has a front principal plane and a rear principal plane. The front principal plane defines a front principal point with reference to light rays that are parallel on entry at the back and focussed at the front focal point. The rear principal plane defines a rear principal point with reference to light rays that are parallel on entry at the front and focussed at the back focal point. In simple optical systems the front and rear principal points can be effectively identical.

For the taking (camera) system:
$f_c$=camera lens focal length
$s_c$=distance from scene to the first principal point of camera optic
$s_c'$=distance from image (at the lenticular film front surface) to the second principal point of camera optic
$p_c$=distance from exit pupil of camera to lenticular film front surface For the projection system (optical printer or scanner)
$f_p$=projection lens focal length
$s_p$=distance from object (at the lenticular film front surface) to the first principal point of projection lens
$s_p'$=distance from image (for example at a CCD or printing paper) to the second principal point of projection lens
$p_p$=distance from entrance pupil of scanner lens to lenticular film front surface For both:
M=magnification=s'/s=image size/object size
1/f=1/s+1/s'

For a very simple system (thin lenses, single principle point at center of lens, entrance pupil coincident to principal point, camera lens focused at infinity, i.e. $s_c$=infinity) $1/f_c$=$1/s_c'$. Reconstruction of an image formed by a micro-lens array film in such a camera will occur when the corresponding lens system pupils are coincident as occurs when $s_p=f_c$ and so the proper projector lens has a focal length defined by $1/f_p=1/f_c+1/s_p'$ and the system magnification is $M_p=s_p'/f_c$ that is, the system is constrained.

The field lens is chosen to adjust the position of at least one pupil to a desired location enabling convenient optical reconstruction. An enabling field lens in a camera moves the exit pupil of camera to the entrance pupil of the projector, both relative to the film and lenticular array. Similarly, an enabling field lens in a projector moves the entrance pupil of projector to the exit pupil of the camera, both relative to the film and lenticular array. Incorporating field lenses in both the taking and projection stages enables a more versatile overall system. An even more versatile system is enabled by an imaging system having an automatically adjustable lens system to provide enabling pupil position as described.

For a simple system where the pupils are about coincident with the principal points, an appropriate focal length $f_f$ for a projector-mounted field lens is given by:
$1/f_f=-1/s_f'+1/s_f$ where
$s_f$=distance from field lens to entrance pupil of projector lens
$s_f'$=distance from field lens to pupil dictated by camera lens, micro-lenses and formed image Likewise, for a simple system where the pupils are about coincident with the principal points, an appropriate focal length $f_f$ for a camera-mounted field lens is given by:
$1/f_f=1/s_f'-1/s_f$ where
$s_f$=distance from field lens to exit pupil of camera lens
$s_f'$=distance from field lens to pupil dictated by projector, micro-lenses and formed image One embodiment of a taking and reading system that incorporates a field lens to adapt an image that has been recorded in a pattern of compressed image elements 52 on a photosensitive element is illustrated in FIGS. 7*a* and 7*b*. FIG. 7*a* schematically depicts a scene 401 photographed using a camera 400 having optical axis 407 and a lens 405 which focuses light from scene 401 onto a silver halide film 403 having an array of lenticular micro-lenses 410. The optics of camera lens 405 form an exit pupil. $P_e$. The array of micro-lenses 410 on silver halide film 403 form a pattern of concentrated image elements 52 that represents the scene information passed by exit pupil $P_e$. The concentrated image elements 52 formed on silver halide film 403 are splayed relative to the optical axis 407 in a manner dictated by the spatial and angular relationship between the exit pupil $P_e$, the individual ones of the array of micro-lenses 410 and silver halide film 403.

FIG. 7b depicts a scanning apparatus 419 for scanning an exposed and photoprocessed lenticular film 421 which, in this embodiment comprises silver halide film 403, after exposure in the camera of FIG. 7a and after silver halide film 403 has been exposed to a development step. Here the scanner apparatus 420 has a light source 423 positioned to illuminate and project the scene imaged on the exposed and photoprocessed lenticular film 421 through the array of micro-lenses 410, a scanner lens 411, and optical element 417 onto solid state imager 409. Solid state imager 409 can comprise a charge coupled device (CD), a complimentary metal oxide (CMOS) imager, a charge injection device or other electronic imager. The optics of the scanning apparatus 420 form an entrance pupil $P_i$. A field lens 415 is located between the exposed and photoprocessed lenticular film 421 and the scanner lens 411. Field lens 415 is chosen as described above to produce an entrance pupil $P_i$ for the scanner lens 411 at a size and position that enables the scanner lens 411 to accept all of the individual projected images produced on illumination of the photoprocessed element 38 having concentrated image elements 52. Since the spatial and angular relationship between the entrance pupil $P_i$ of the scanner lens 411 as modified by field lens 415 and the micro-lens mediated image projected from the developed compressed image elements 52 carrying scene information are such that each compressed image element 52 is fully cast onto the entrance pupil $P_i$ of the projection optic, a high quality image is delivered to imager 409. It will be appreciated that the scanner lens 411 and solid state imager 409 serve to represent a specific embodiment of the invention. A printer lens and light sensitive photographic paper can replace them with equally pleasing results. Alternatively, other projection lens systems and other art known light sensitive materials or devices can be usefully employed to observe or record an optically reconstructed image.

FIGS. 8a and 8b illustrate another embodiment of a system in accordance with the invention. Here a camera 701 with a lens 703 suitable for photographing a scene 705 has a micro-lens array 707 in the exposure light-path 709. Camera 701 does not have a field lens or such to purposefully distort the image. A conventional film 711 can be employed in camera 701. A reader 713 can be a scanner, viewer or optical printer. In any case, reader 713 will have a light source 714 for transmitting light 715 through a processed film 717 scene exposed in the camera 701 of FIG. 8a. Reader 713 additionally includes a micro-lens array 719 in a reader light path 716. Micro-lens array 719 is matched to the micro-lens array 707 of camera 701. A field lens 721 is provided in reader light path 716 and adapts the light to compensate, by distortion, for mismatches between the scene/pupil/image spatial relationship established at taking and the image/pupil/output spatial relationship encountered with a projection lens 723 and a reading plane 725 formed, for example, by a light sensitive surface of a solid state imager or a photosensitive element in reader 713. The combination allows for an optical reconstruction the pattern of concentrated image elements 52 to form an image suitable for direct optical printing or scanning. While digital manipulation of a scanned image is contemplated, digital reconstruction of a scanned image is not required.

FIGS. 9a and 9b illustrate another embodiment of a system of the present invention. Here a camera 801 has a lens 803 suitable for photographing scene 805 and a micro-lens array 807 in an exposure light-path 809. Camera 801 has a field lens 821 to purposefully distort the image so as to compensate for mismatches between the scene/pupil/image spatial relationship established at taking and the image/pupil/output spatial relationship encountered with a projection lens 823 and a reading plane 825 formed, for example, by a light sensitive surface of a solid state imager or a photosensitive element in a reader 813. A conventional film 811 can be employed in camera 801 to record the scene. Reader 813 can be a scanner, viewer or an optical printer. In any case, the reader 813 will have a light source 814 for transmitting light 815 through a processed film 817 scene exposed in camera 801 of FIG. 9a. Reader 813 will additionally include a matched micro-lens array 819 in reader light path 816 formed, for example by a light sensitive surface of a solid state imager or a photosensitive element. The combination allows for an optical reconstruction of the pattern of concentrated image elements 52 to form an image suitable for direct optical printing or scanning. While digital manipulation of a scanned image is contemplated, digital reconstruction of a scanned image is not required.

FIGS. 10a and 10b illustrate another embodiment of system of the invention. Here a camera 901 is a conventional camera with a lens 903 suitable for photographing a scene 905 via an exposure light-path 909. Camera 901 does not have a micro-lens array or a field lens or such to purposefully distort the image. Film 911 employed in camera 901 will have a temporary micro-lens array 912 and will be loaded in camera 901 in a manner that ensures exposure of the light sensitive materials of film 911 through micro-lens array 912. Micro-lens array 912 is shown as an emulsion side array however, micro-lens array 912 can also be a base side array. In this embodiment micro-lens array 912 is removed from film 911 after exposure and before reading, optionally as part of photoprocessing. The reader 913 can be a scanner, viewer or optical printer. In any case, reader 913 has a light source 914 for transmitting light 915 through a processed film 917 scene exposed in the camera of FIG. 10a. Reader 913 additionally includes a matched micro-lens array 919 in reader light path 916, and a field lens 921 that will adapt the light to compensate, by distortion, for mismatches between the scene/pupil/image spatial relationship established at taking and the image/pupil/output spatial relationship encountered with a projection lens 923 and a reading plane 925 formed, for example by a light sensitive surface of a solid state imager or a photosensitive element. The combination allows for an optical reconstruction of the pattern of compressed image elements 52 to form an image suitable for direct optical printing or scanning. While digital manipulation of a scanned image is contemplated, digital reconstruction of a scanned image is not required.

Figure 11A:
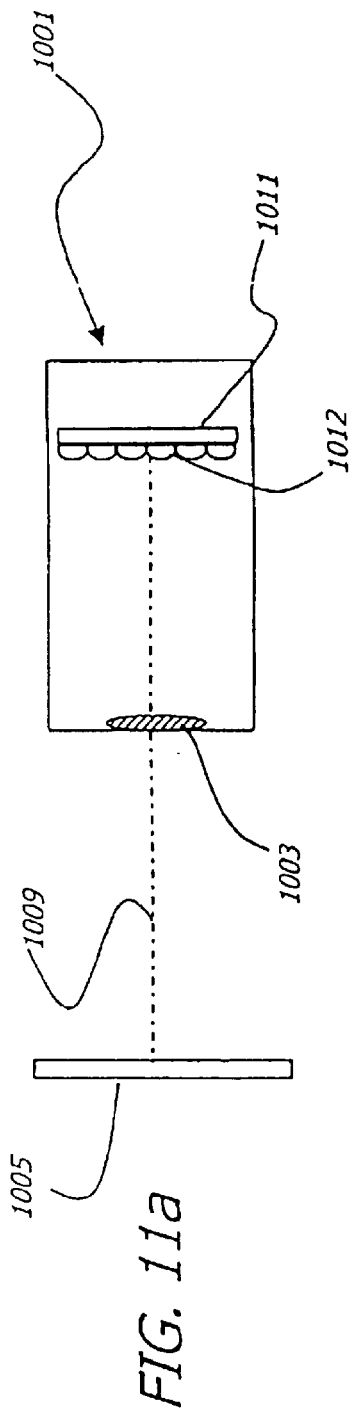
FIGS. 11a–11b illustrate an image forming system employing a permanent film integral micro-lens array in a camera with a field lens in a reader.
Figure 11B:
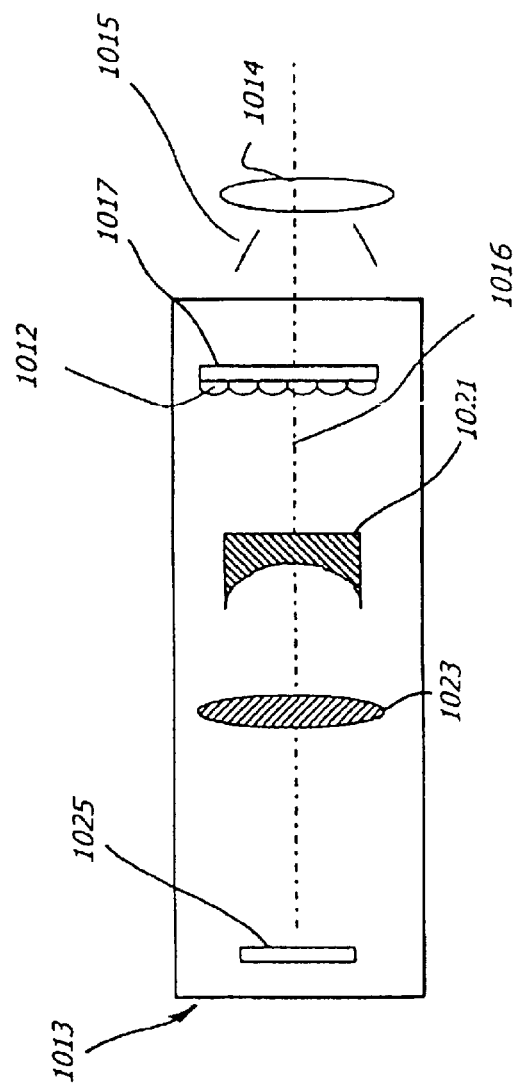

FIGS. 11a and 11b illustrate another embodiment of the invention. Here a camera 1001 is a conventional camera with a lens 1003 suitable for photographing scene 1005 via an exposure light-path 1009. Film 1011 employed in camera 1001 has a permanent micro-lens array 1012 and is loaded in the camera 1001 in a manner that ensures exposure of the light sensitive materials of the film 1011 through micro-lens array 1012. Micro-lens array 1012 is shown in FIG. 11a as an emulsion side array but alternatively can be a base side array. Reader 1013 can be a scanner, viewer or optical printer. In either case, reader 1013 has a light source 1014 for transmitting reader light path 1015 through a processed film 1017 scene exposed in camera 1001 of FIG. 11a. Reader 1013 additionally includes a field lens 1021 disposed in reader light path 1015 that will compensate, by distortion, for mismatches between the scene/pupil/image spatial relationship established at taking and the image/pupil/output spatial relationship encountered with the a projection lens 1023 and reading plane 1025 formed, for example, by a light sensitive surface of a solid state imager or a photosensitive element. The combination allows for an optical reconstruction of the patterns of compressed image element 52 to form an image suitable for direct optical printing or scanning. While digital manipulation of a scanned image is contemplated, digital reconstruction of a scanned image is not required.

FIGS. 12a and 12b illustrate still another embodiment of the invention. Here camera 1101 has a lens 1103 suitable for photographing scene 1105 onto film 1111 via exposure light-path 1109. Camera 1101 has a field lens 1121 to purposefully distort the image so as to compensate for mismatches between the scene/pupil/image spatial relationship established at taking and the image/pupil/output spatial relationship encountered with a projection lens 1123 and a reading plane 1125 formed, for example, by a light sensitive surface of a solid state imager or a photosensitive element in reader 1113. Film 1111 employed in camera 1101 has a temporary micro-lens array 1112 and is loaded in camera 1101 in a manner that ensures exposure of the light sensitive materials of film 1111 through micro-lens array 1112. Micro-lens array 1112 is shown as an emulsion side array but alternatively can be a base side array. Micro-lens array 1112 will be removed from film 1111 after exposure and before reading, optionally as part of photo processing. Reader 1113 can be a scanner, viewer or an optical printer. In any case, reader 1113 will have a light source for transmitting light 1115 through a processed film 1117 scene exposed in the camera of FIG. 12a. Reader 1113 additionally includes a matched micro-lens array 1119 in reader light path 1116, a projection lens 1123 and reading plane 1125. The combination allows for an optical reconstruction of the pattern of compressed image elements 52 to form an image suitable for direct optical printing or scanning. While digital manipulation of a scanned image is contemplated, digital reconstruction of a scanned image is not required.

Figure 13A:
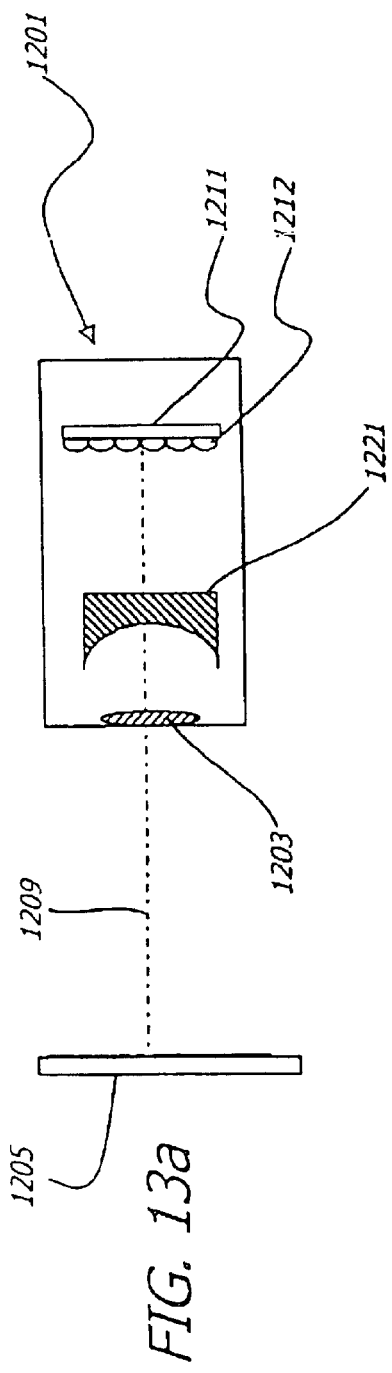
FIGS. 13a–13b illustrate an image forming system employing a permanent film integral micro-lens array and a field lens in a camera and a reader.
Figure 13B:
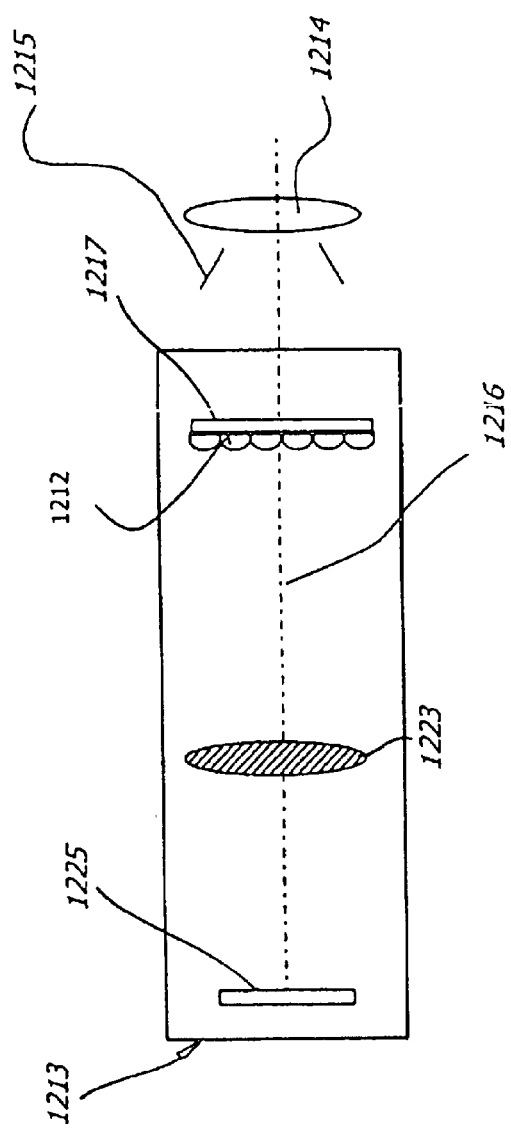

FIGS. 13a and 13b illustrate a further embodiment of the invention. Here camera 1201 has a lens 1203 suitable for photographing scene 1205 onto film 1211 via exposure light-path 1209. Camera 1201 has a field lens 1221 to purposefully distort the image so as to compensate for mismatches between the scene/pupil/image spatial relationship established at taking and the image/pupil/output spatial relationship encountered with the projection lens 1223 and a reading plane 1225 formed, for example, by a light sensitive surface of a solid state imager or a photosensitive element in reader 1213. Film 1211 employed in camera 1201 has a permanent micro-lens array 1212 and is loaded in a camera 1201 in a manner that ensures exposure of the light sensitive materials of film 1211 through the micro-lens array 1212. Micro-lens array 1212 is shown as an emulsion side array but can also be a base side array. Reader 1213 can be a scanner, viewer or an optical printer. In any case, reader 1213 will have a light source 1214 for transmitting light 1215 through a processed film 1217 having an image of the scene exposed in the camera of FIG. 13a. Image modulated light is decompressed by permanent micro-lens array 1212 and passes through projection lens 1223 to form an image on reading plane 1225. The combination allows for an optical reconstruction of the compressed image elements in a form suitable for direct optical printing or scanning. While digital manipulation of a scanned image is contemplated, digital reconstruction of a scanned image is not required.

Figure 14A:
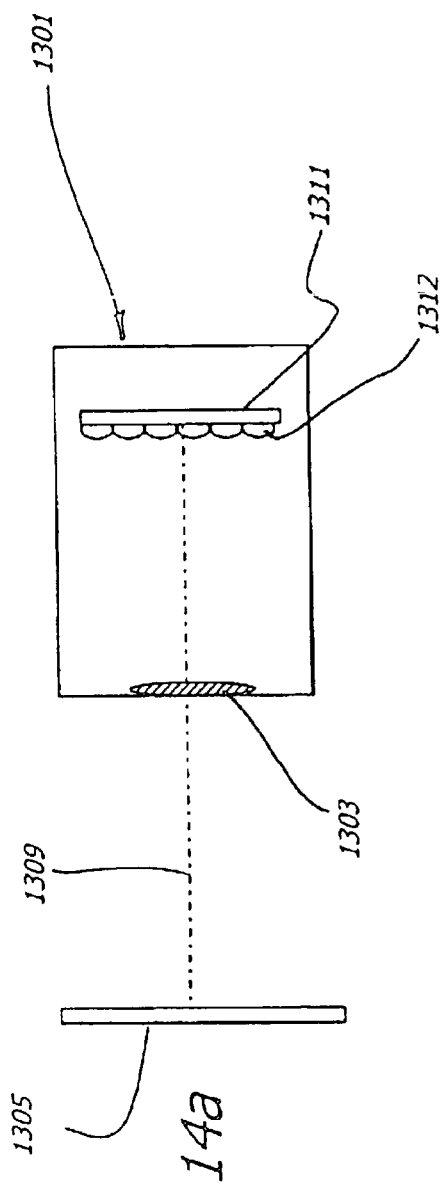
FIGS. 14a–14b illustrate an image forming system employing a distorted micro-lens array that skews images captured by a camera to match the optics of a reader.
Figure 14B:
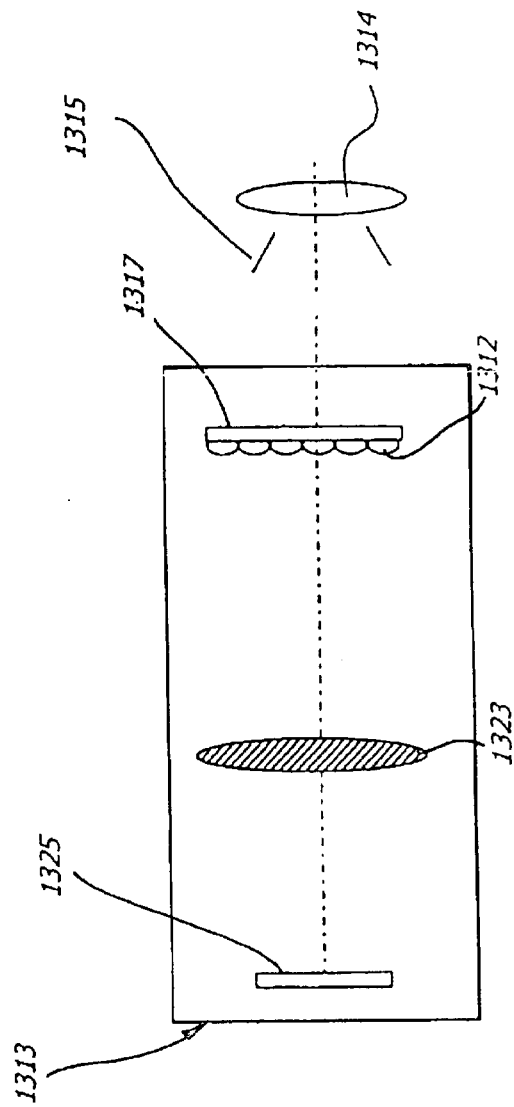

FIGS. 14a and 14b illustrate a further embodiment of the invention. Here the camera 1301 with lens 1303 suitable for photographing scene 1305 onto film 1311 via exposure light-path 1309. Camera 1301 does not have a micro-lens array or a field lens or such to purposefully distort the image. Film 1311 employed in camera 1301 has a permanent micro-lens array 1312 and is loaded in camera 1301 in a manner that ensures exposure of the light sensitive materials of the film 1311 through the micro-lens array 1312. Micro-lens array 1312 is shown positioned on a base side of film 1311 but can also be positioned an emulsion side of film 1311. The permanent micro-lens array 1312 will be distorted so as to compensate for mismatches between the scene/pupil/image spatial relationship established at taking and the image/pupil/output spatial relationship encountered with a projection lens 1323 and a reading plane 1325 formed, for example, by a light sensitive surface of a solid state imager or a photosensitive element in reader 1313. The distortions in micro-lens array 1312 will skew the positions of the formed images in a manner like that produced by incorporation of an appropriately selected field lens in camera 1301. The degree of distortion required in the micro-lens array 1312 for this system can be practically determined by photographing a scene in camera 1301 using an undistorted micro-lens array both with and without a field lens selected for compatibility with reader 1313. Alternatively, the degree of distortion required in the micro-lens array 1312 can be readily determined by calculating the individual required micro-lens positions and characteristics using the standard lens equations recited above. Reader 1313 can be a scanner, viewer or an optical printer. In any form reader 1313 will have a light source 1314 for transmitting light 1315 through a processed film 1317 having an image of the scene exposed in the camera of FIG. 14a. Image modulated light is decompressed by permanent micro-lens array 1312 and passes through a projection lens 1323 to form an image on reading plane 1325. The combination allows for an optical reconstruction of the formed dot or line pattern image in a form suitable for direct optical printing or scanning. While digital manipulation of a scanned image is contemplated, digital reconstruction of a scanned image is not required.

Figure 15:
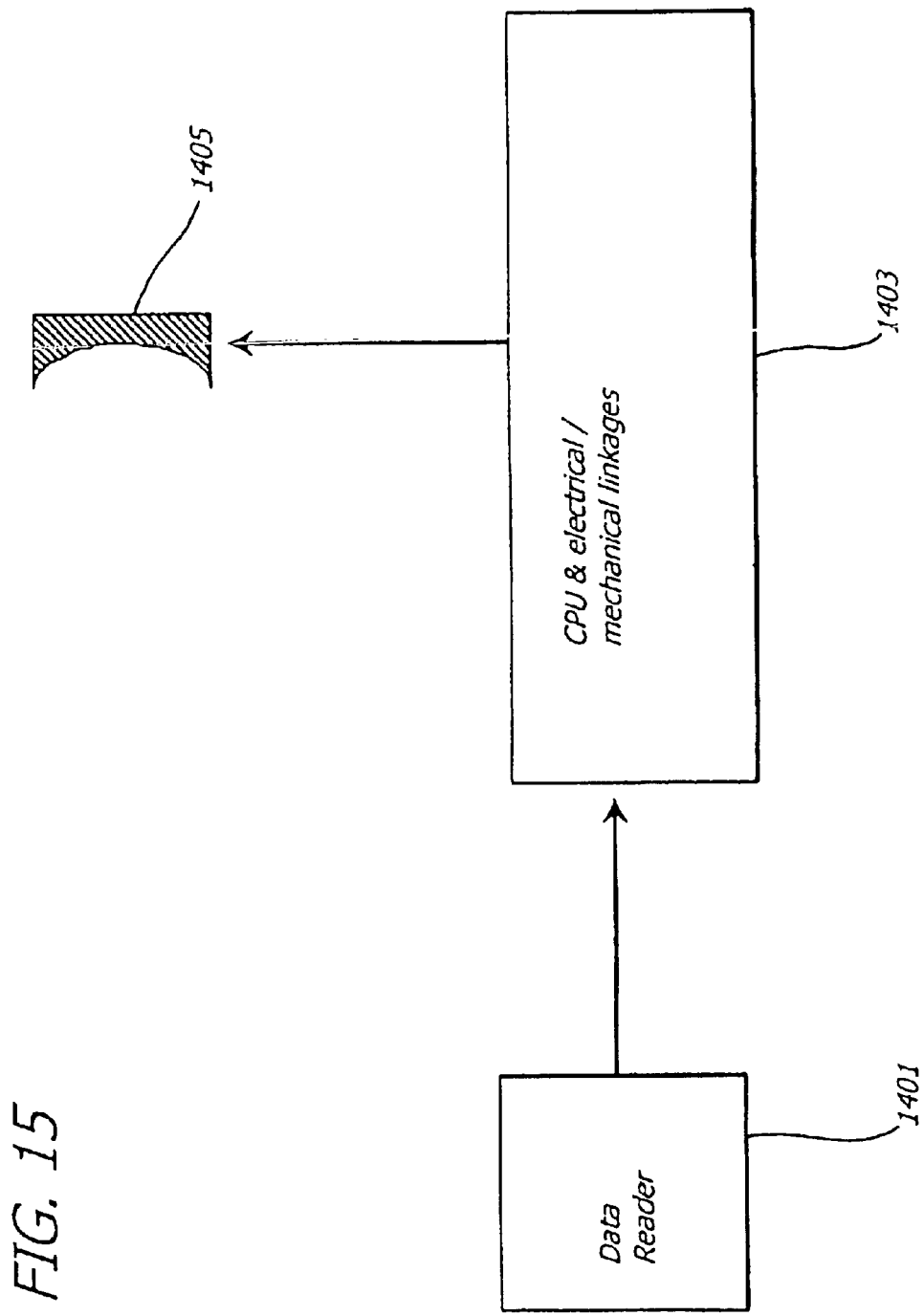
FIG. 15 is a schematic diagram of a reader employing a distortable micro-lens array incorporating the enabling features of a field lens according to the invention.

In a distinct embodiment schematically illustrated in FIG. 15, the film or film container can carry a record of the camera optics and a reader system such as, for example, reader 1313, can have a data reader 1401 capable of discerning the recorded camera optics, an adjustable field lens 1403, and means of adjusting the adjustable field lens 1405 to enable automatic compatibility between any of several micro-lens imaging cameras and the reader. For example, the record of the camera optics can be encoded on a film or film container at the time of photography using well known metadata communication techniques or can be encoded at the time of manufacture, as for example with a camera preloaded with film. One example of such a camera is the camera 20 of FIG. 1. Camera 20 has a controller 62 that is adapted to capture a record of camera optics at the time that an image is captured. For example, camera 20 has a controller 62 that uses a lens position detector 63 to determine the distance between the entrance pupil of taking lens system 22 and photosensitive element 30 at the time of image capture and cause a communication head 66 to record this information on camera 20. This signal can be detected by data reader 1601 and used by the reader to adapt the field lens to de-skew the image.

In an alternative distinct embodiment, the data regarding the optics can be used by the reader to determine whether to selectively remove and replace a field lens in the optical path. In yet another distinct embodiment, the field lens may be a deformable lens that is adjusted by deformation to provide the required pupil adjustment. In yet another embodiment, the projector lens itself can be deformable lens system that is deformed to provide the enabling pupil adjustment. Deformable lens systems are well known in astronomical imaging where they are often described as adaptive optics.

Recovery of a Residual Image

Figure 16:
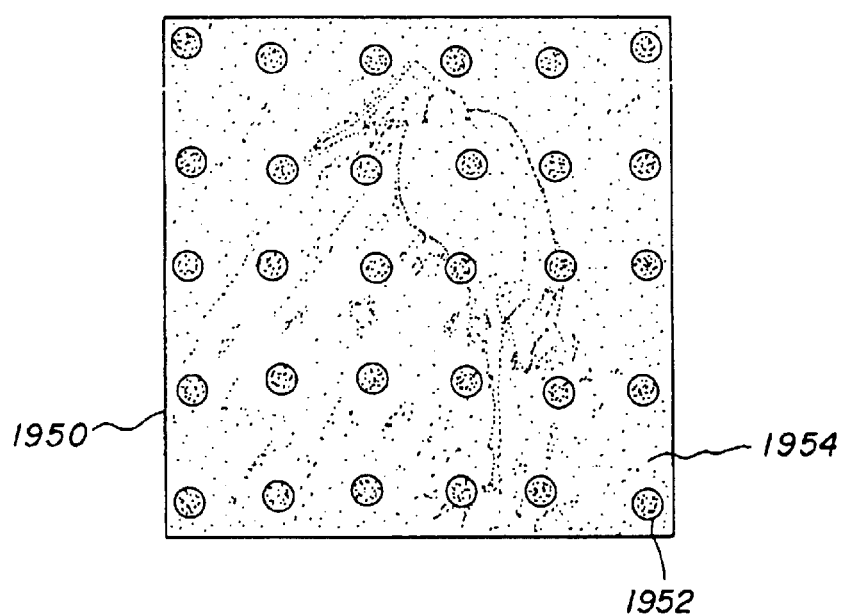
FIG. 16 is an example of a photosensitive element having a pattern of concentrated image elements and a residual image recorded thereon.

It will be recalled that when light from a scene is within a first exposure range 84, a residual image can be formed in the residual image area of a photographic element. FIG. 16 shows an example of a photoprocessed photographic element 1950 with a pattern of concentrated image elements 1952 and a residual image 1954 recorded thereon. The presence of the concentrated image elements 1952 makes the underlying residual image 1954 have an unpleasing appearance. Accordingly, to recover an image from residual image 1954 it is necessary to remove the concentrated image elements 1952 from residual image 1954. In accordance with the present invention, the concentrated image elements 1952 are removed from residual image 1954 by using an optical system to project only light passing through the areas of the image that do not include the compressed image areas. This can be done by choosing an appropriate aperture for an optical system in a reader. The condition that is to be met in defining such an aperture is that the aperture of such an optical system is a composite aperture obtained by adding a micro-lens numerical aperture to an inverted micro-image numerical aperture.

Figure 17:
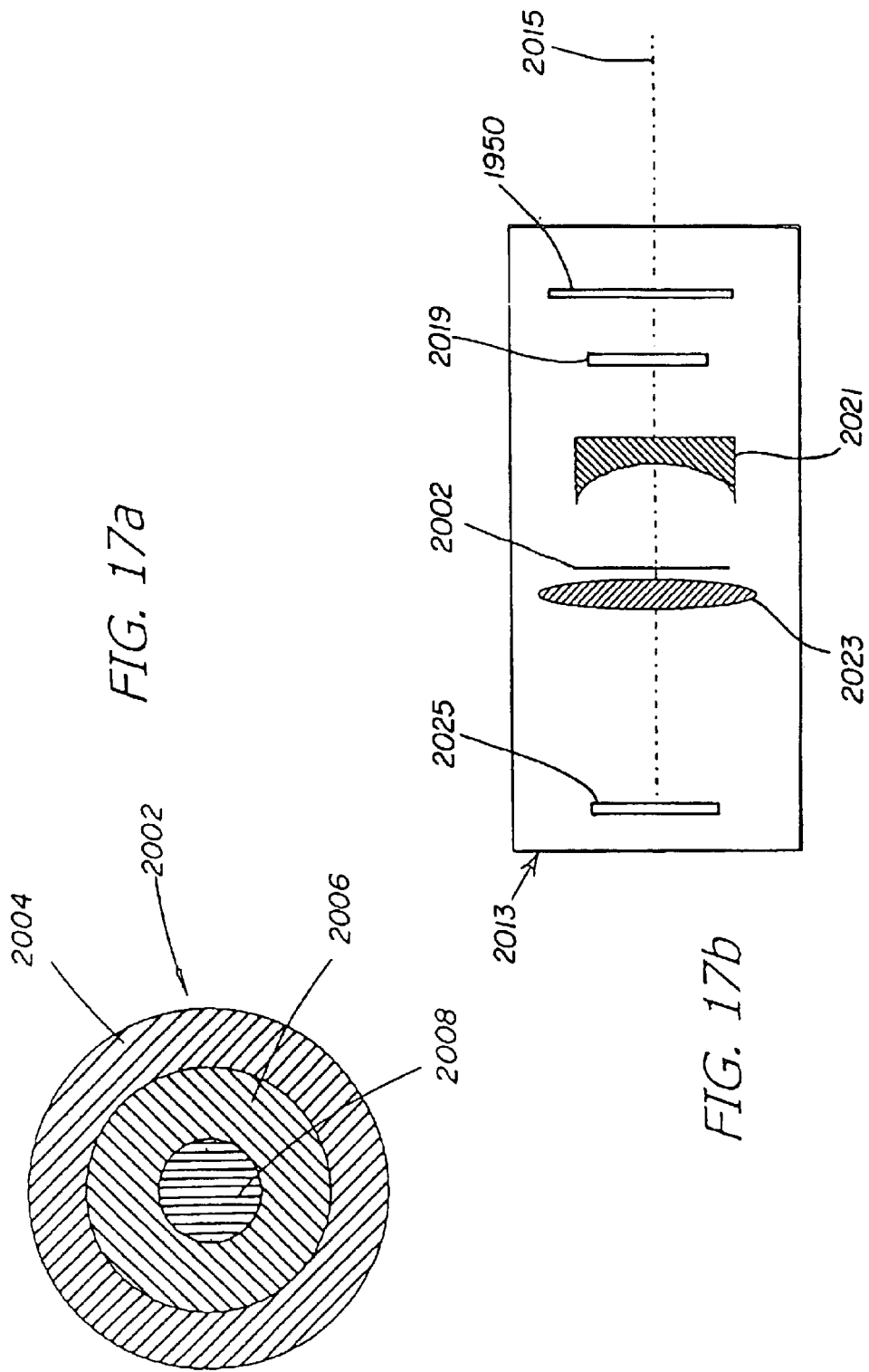
FIG. 17a shows a face view of an inverse aperture.
FIG. 17b shows an inverse aperture positioned in a projection system.

FIG. 17*a* shows a face view of an inverse aperture 2002 useful for selectively extracting image information from the residual image area 1954. The inverse aperture 2002 has a central opaque stop 2008, a transparent annular area 2006 and a surrounding opaque stop 2004. FIG. 17*b* shows a side view of reader 2013 having an inverse aperture 2002. In the embodiment shown, the inverse aperture 2002 is positioned to control light transmitted through the concentrated image areas 48 of an imagewise exposed and photoprocessed element 2017, micro-lens array 2019 and field lens 2021 and the projection lens system 2023. The central opaque stop 2008 of inverse aperture 2002 is sized to block light modulated by the concentrated image element 1952 of photoprocessed element 1950 and directed by the micro-lens array 2019 and the field lens 2021. The transparent annular area 2006 and surrounding opaque stop 2004 are sized so that the f-number of the projection lens system 2023 matches the f-number of the micro-lens of the micro-lens array 2019. The matching of these f-numbers assures that the light modulated by the residual image areas 1954 of photoprocessed element 1950 is transmitted to reading plane 2025, while the central opaque stop 2008 intercepts the light modulated by the concentrated image areas 1952 of photoprocessed element 1950. Like applications of an inverse aperture can be applied in a straightforward manner with the other embodiments of the invention to achieve like results.

Figure 18:
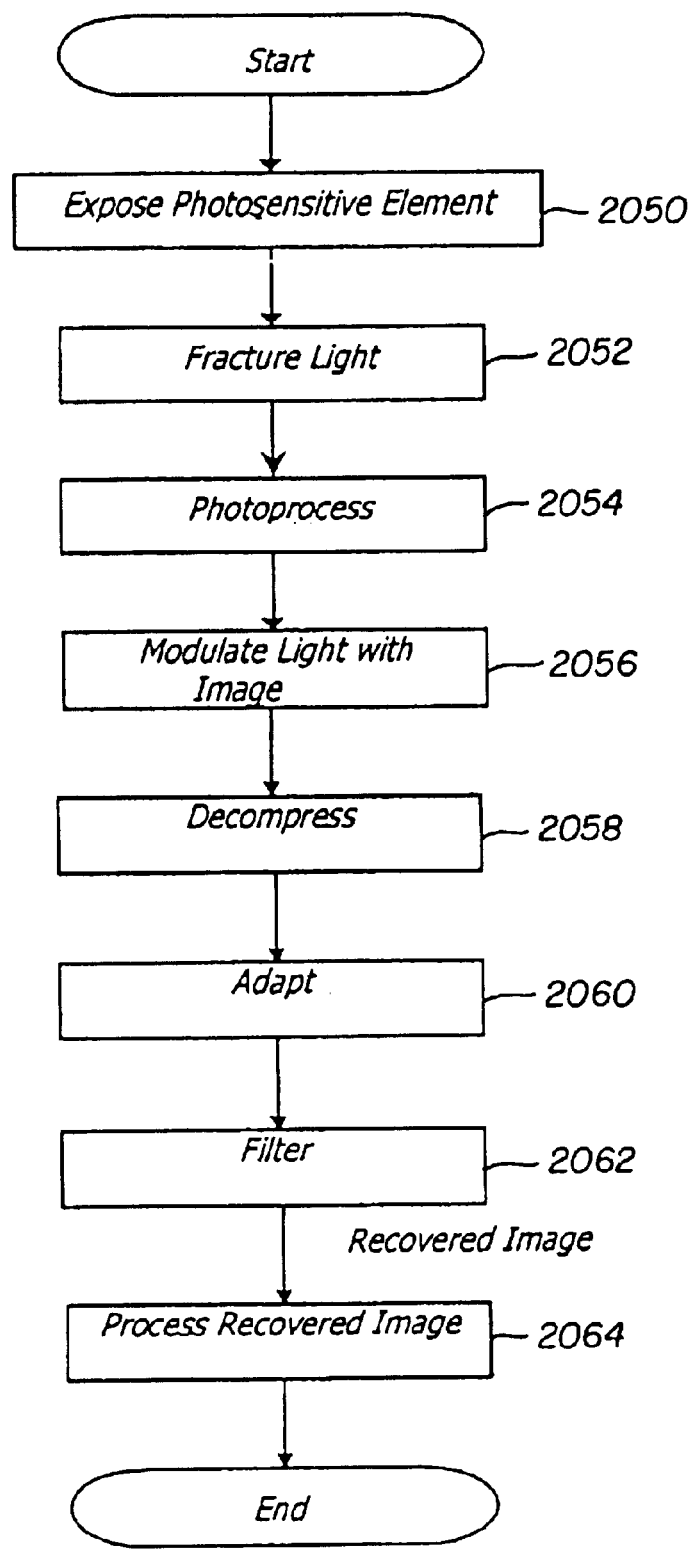
FIG. 18 shows an embodiment of a photographic method according to the invention.

FIG. 18 shows one embodiment of a method for using the inverse aperture of 2002 and a reader 2013 of FIGS. 17*a* and 17*b* respectively, to recover an output image. The first step of this method, a photosensitive element e.g. 1950 is exposed to light from the scene including light within a second exposure range 86 described above with respect to FIGS. 2*a*, 2*b* and 2*c*. (step 2050) As is also described above, the light is fractured into a concentrated portion and a residual portion (2052). A residual image e.g. 1954 is recorded on photosensitive element 1950. Photosensitive element is then photoprocessed (step 2054) so that the photosensitive element becomes a photoprocessed element shown as 2017 in FIG. 17*b*. Light from a light source 2016 is projected through photoprocessed element 2017, modulated by the photoprocessed element 2017 and passed along a light path 2015. (step 2058) The modulated light then passes through an array of micro-lenses 2019 where the image contained in the modulated light is decompressed. (step 2058) The decompressed modulated light is then optionally adapted by field lens 2021 to de-skew the light. (step 2060) The decompressed, de-skewed light is then filtered by a filter that intercepts light modulated by the concentrated image areas recorded on photoprocessed element 2017. (step 2062) As a result of this filtering process, only light that is modulated by residual image area 1950 is used to form an image at reading plane 2025. The image formed in reading plane 2025 comprises the recovered image. This image is then processed. (step 2064)

Combination Apparatus for Recovering Images
Image Recovery System

It will be recalled that after photoprocessing, photoprocessed element 38 contains an image in concentrated image elements 52 and an image in the form of residual image 54 having concentrated image elements 52. In order to obtain the full benefit of the extended range provided by micro-lens assisted photography, it is useful to provide a reading device that is capable of recovering images from a filmstrip having images recorded on it in the form of concentrated image elements 1952 and in the form of residual images such as image 1954. One example of such a device is illustrated in FIG. 19.

Figure 19:
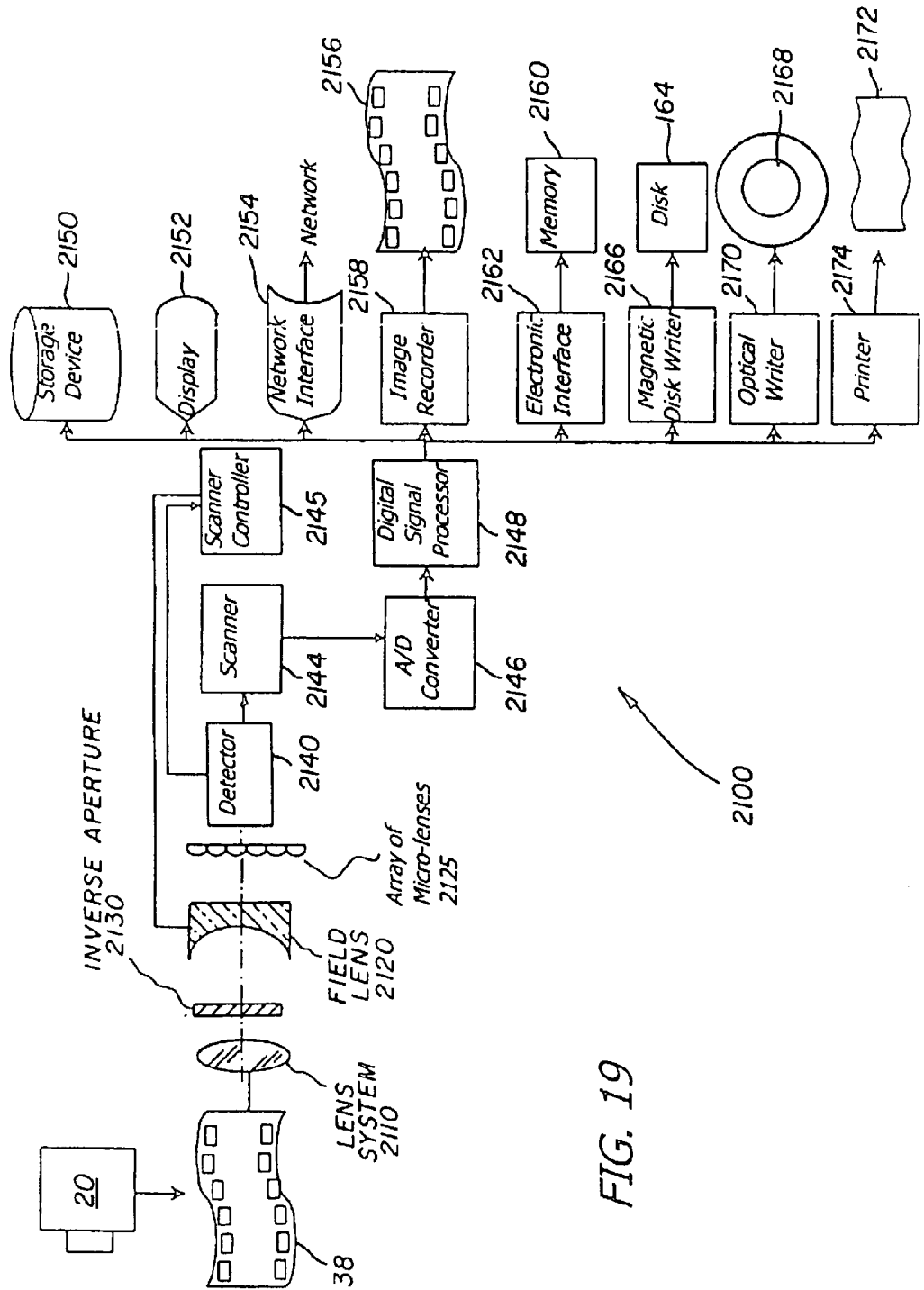
FIG. 19 is a schematic diagram of a projector and image scanner useful in the practice of the invention.
Figure 20D:
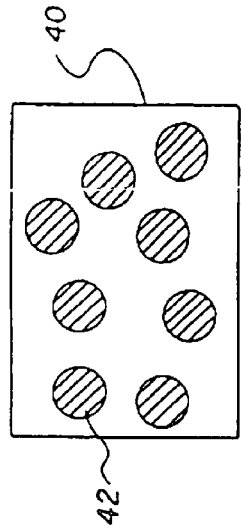
FIGS. 20a–20e illustrates embodiments of an array of micro-lenses useful in practicing the present invention.
Figure 20E:
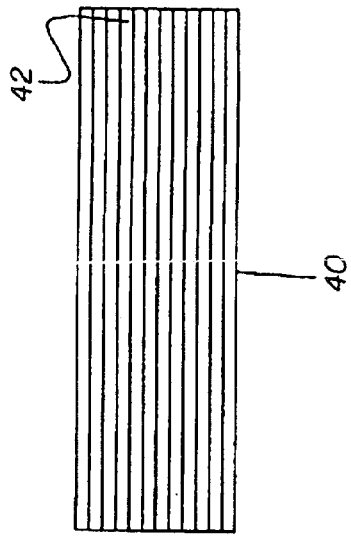
Figure 20A:
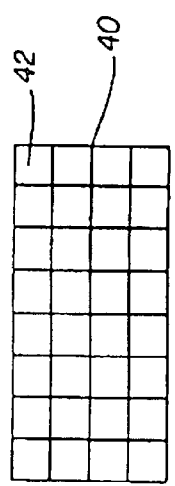
Figure 20B:
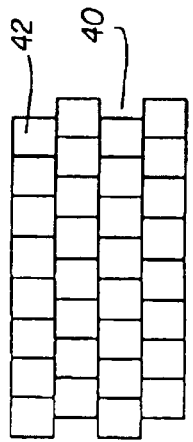
Figure 20C:
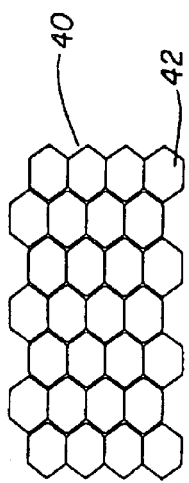

As is shown in FIG. 19, a camera 20, is used to record images that have been fractured by a micro-lens array 40 onto a filmstrip which is then photoprocessed become photoprocessed element 38 shown in FIG. 19. Images on photoprocessed element 38 are read by a reading device 2100 comprising an electronic scanner. As is shown in FIG. 19, scanner 2100 comprises an optical system 2105 including a field lens 2120, an array of micro-lenses 2125, an inverse aperture 2130 and a lens system 2110. The optical system 2105 is used to form a meaningful image on scanner 2144. However, for this to occur, it is necessary to determine whether the image being scanned is an image that is recorded as a pattern of concentrated image elements in 1952 or a residual image 1954. In a first embodiment detector 2140 is provided. Detector 2140 is adapted to detect a signal recorded on photoprocessed element 38 indicative of whether the image is recorded in a pattern of concentrated image elements 52 or recorded as a residual image 54. In this regard, referring again to FIG. 1, camera 20 is shown having an optional light sensor 60, controller 62, photosensitive element type sensor 64, and communication head 66. These optional components can be used to detect the light level in the scene at the time that and image is exposed and to encode in a signal photosensitive element 30 indicating whether photosensitive element 30 contains image information from a first exposure range such as would be contained within concentrated image elements 52, a second exposure range such as would be recorded as a residual image 54 or both.

Light sensor 60 can comprise, for example, a photovoltaic cell that generates, for example, a voltage output that is proportionate to the amount of light in the scene. Controller 62 detects this signal and determines scene brightness based upon this signal. Controller 62 can be a digital controller such as a microprocessor or microcontroller or analog controller such as a programmable analog device. Where controller 62 is of the analog type, an analog to digital converter (not shown) may be interposed between the light sensor 60 and controller 62 to convert the voltage into digital form.

Photosensitive element type sensor 64 generates a signal representative of the photosensitive element type that is loaded into camera 20. Photosensitive element type sensor 64 can comprise a DX or optical bar code reading apparatus for directly reading photosensitive element type markings or other signals indicative of photosensitive element type from a photosensitive element 30 or photosensitive element canister (not shown). Photosensitive element type sensor 64 can also comprise a switch or other setting device allowing user to designate the type of photosensitive element 30 that is located in camera 20. Where a photosensitive element type is marked on photosensitive element 30 an appropriate communication head 66 can be used as a photosensitive element type sensor 64. Controller 62 receives a signal from light sensor 60 and photosensitive element type sensor 64 and determines whether light from the scene will have a range of intensity sufficient to form an image that is recorded the form of a pattern of concentrated image elements 52 or a residual image 54. Controller 62 then causes communication head 66 to encode a signal on photosensitive element 30 indicating the type of edge that is recorded on photosensitive element 30. This signal can be optical, magnetic, mechanical or other type. In an alternative embodiment the photosensitive element 30 is associated with an electronic memory such as an integrated circuit memory (not shown). In this alternative embodiment, data regarding the type of photosensitive element 30 is recorded in the electronic memory associated with the integrated circuit at the time of manufacture, and extracted from photosensitive element 30 by communication head 66. This communication can be conducted by optical, electronic radio frequency or any convenient means. Data indicating image type is also recorded in the electronic memory in a similar fashion.

A signal can also be recorded on photosensitive element 30 by mechanical modifications to photosensitive element 30 or photosensitive element cartridge (not shown). In such embodiments, communication head 66 can cut, puncture or otherwise modify photosensitive element 30 or photosensitive element cartridge (not shown) to record signals and can also be adapted to detect such signals. Any communication scheme known in the art may be employed. Useful communication schemes include cartridge $D_x$ or $I_x$ codes, bar codes, on cartridge chips, photosensitive element optical characters, photosensitive element magnetics and such as are disclosed in U.S. Pat. No. 6,222,607 B1 (Szajewski et al.), the disclosure of which are incorporated by reference.

Detector 2140 detects such recorded signals and generate a signal which is detected by scanner controller 2145. Detector 2140 can also examine the optical characteristics of the image to determine whether a particular photosensitive element contains images that are encoded in the form of a pattern of concentrated image elements 52 or in a residual image 54. Scanner controller 2145 then causes field lens 2120 and/or inverse aperture 2130 to actuate in a manner that permits recovery of the image from either of the pattern of concentrated image elements 52 or a residual image 54 as is described above.

In one embodiment inverse aperture 2002 can be selectively inserted into light path 2102 when it is determined that the image is recorded on photoprocessed element 38 is a residual image and is removed where it is determined that the image on photoprocessed element 38 is created in a pattern of concentrated image elements. The recovered image is projected onto a scanner 2144. Scanner 2144 can comprise an analog scanner, and/or a digital scanner. In this regard, scanner 2144 can comprise, for example, an array detector (not shown) such as array of charge coupled devices. Alternatively, scanner 2144 can comprise a linear array detector for scanning the recovery image on a line by line basis. Other types of conventional scanning methods and devices can be used. For pictorial imaging, a sequence of red, green and blue picture elements are generated that can be correlated with spatial location information provided from scanner 2144. Where necessary, this information is placed in digital form on an analog to digital converter 2146.

The scanner 2144 can derive imaging information from the photosensitive element in any number of conventional manners. In one preferred embodiment, the image recorded on photoprocessed element 38 is scanned successively within blue, green, and red light within a single scanning beam that is divided and passed through blue, green and red filters to form separate scanning beams for each color record. If other colors are imagewise present in photoprocessed element 38, then other appropriately colored light beams can be employed. Alternatively, when a monochromatic color forming material is employed, that material can be scanned and treated as such. As a matter of convenience, the ensuing discussion will focus on the treatment of color forming materials. In one embodiment, a red, green and blue light are used to retrieve imagewise recorded information and photoprocessed element 38 is further scanned in infrared light for the purpose of recording the location of non-image imperfections. When such an imperfection or "noise" scan is employed, the signals corresponding to the imperfection can be employed to provide a software correction so as to render the imperfections less noticeable or totally non-noticeable in soft or hard copy form. The hardware, software and technique for achieving this type of imperfection reduction are described by U.S. Pat. No. 5,266,805 (Edgar) and WO 98/31142 (Edgar et al.), WO 98/34397 (Edgar et al.), WO 99/40729 (Edgar et al.) and WO 99/42954 (Edgar et al.).

In another embodiment, the formed image is scanned multiple times by a combination of transmission and reflection scans, optionally in infrared and the resultant files combined to produce a single file representative of the initial image. Such a procedure is described by U.S. Pat. Nos. 5,466,155, 5,519,510, 5,790,277; and 5,988,896 all in the name of Edgar et al.

Image data is processed after scanning to ensure the fidelity of color data in advance of the recovery of image information from concentrated image areas 48 or the residual image area 50. For example, specific techniques for transforming image-bearing signals after scanning are disclosed in U.S. Pat. No. 5,267,030 (Giorgianni et al.), U.S. Pat. No. 5,528,339 (Buhr et al.), U.S. Pat. No. 5,835,627 (Higgins et al.), U.S. Pat. No. 5,694,484 (Cottrell et al.), U.S. Pat. No. 5,962,205 (Arakawa et al.) and U.S. Pat. No. 6,271,940 B1 (Deschuytere et al.). Further illustrations of these procedures are provided by Giorgianni and Madden's *Digital Color Management*, Addison-Wesley, 1998. The signal transformation techniques disclosed can be further modified so as to deliver an image that incorporates the look selected by a customer. (references to be provided)

Matrices and look-up tables (LUTs) can provide useful image transformation. In one embodiment, three 1-dimensional look-up tables can be employed, one for each of a red, green, and blue color record. Due to the complexity of these transformations, it should be noted that the transformation can often be better accomplished by a 3-dimensional LUT. In another embodiment, a multi-dimensional look-up table can be employed, all as described in U.S. Pat. No. 4,941,039 (D'Errico).

In one variation, the R, G, and B image-bearing signals from a scanner are converted to an image metric which corresponds to that from a single reference image-recording device or medium and in which the metric values for all input media correspond to the trichromatic values which would have been formed by the reference device or medium had it captured the original scene under the same conditions under which the input media captured that scene. For example, if the reference image recording medium was chosen to be a specific color negative film, and the intermediary image data metric was chosen to be the measured RGB densities of that reference film, then for an input color negative film, the R, G, and B image-bearing signals from a scanner would be transformed to the R', G', and B' density values corresponding to those of an image which would have been formed by the reference color negative photosensitive element had it been exposed under the same conditions under which the actual color negative material was exposed.

In another variation, if the reference image recording medium was chosen to be a specific color negative film, and the intermediary image data metric was chosen to be the predetermined R', G', and B' intermediary densities of that reference film, then for an input color negative photosensitive element according to the invention, the R, G, and B image-bearing signals from a scanner would be transformed to the R', G', and B' intermediary density values corresponding to those of an image which would have been formed by the reference color negative photosensitive element had it been exposed under the same conditions under which the actual color negative recording material was exposed. The result of such scanning is digital image data that is representative of the image that has been captured on photosensitive element 30.

Digital signal processor 2148 receives a signal that is output by the scanner 2144 and/or analog to digital converter 2146. Digital signal processor 2148 is adapted to process the signal in a manner that will be described below and to place the signal in a form for its intended use.

Post Scanning Image Processing

As discussed above, after an output image is recovered, it may be desirable to perform additional processing of the output image in order to further improve the image and to prepare the image data for subsequent processing. The type of post image processing that is performed is dependent upon the type of apparatus used to reproduce the image. For example, where the device used to reproduce the output image is a conventional optical photofinishing system. Conventional, optical and chemical means can be used to improve the appearance of the image. Such techniques may include advantageously photochemically modifying the saturation or color content of the image and/or modifying the apparent contrast of the image. Optical techniques such as cropping, simulated zoom, and other techniques can also be used to improve the image in such a system.

When a recovered image is scanned or otherwise transferred from the optical domain or digital or electronic domain, additional image manipulation may be used including, but not limited to, scene balance algorithms (to determine corrections for density and color balance based on the densities of one or more areas within the processed film), tone scale manipulations to amplify photosensitive element underexposure gamma as described in U.S. Pat. No. 5,134,573 (Goodwin et al.), non-adaptive or adaptive sharpening via convolution or unsharp masking, red-eye reduction, and non-adaptive or adaptive grain-suppression. Moreover, the image may be artistically manipulated, zoomed, cropped, and combined with additional images or other manipulations as known in the art. Other useful image manipulation sequences are described by EP-A-0 961,482 (Buhr et al.), EP-A-0 961,483 (Buhr et al.), EP-A-0 961,484 (Buhr et al.), EP-A-0 961,485 (Buhr et al.) and EP-A-0 961,486 (Buhr et al.), the disclosures of all of which are incorporated by reference.

Once a recovered image has been manipulated and any additional image processing and manipulation has occurred, the image may be electronically transmitted to a remote location or locally written to a variety of output devices as shown in FIG. 19 including, but not limited to, photosensitive element recorder 2156, by way of an image recorder 2158, a print media 2172 such as a paper or film by way of a printer 2174, thermal printers, electrophotographic printers, inkjet printers, display 2152, CD or DVD disks 2168, by way of an optical writer 2170 magnetic electronic signal storage disks 2164 by way of a magnetic disk writer, and other types of storage devices 2150 and display devices 2152 known in the art.

In this regard, the image can optionally be processed to adapt it for the end use. For example, output image-bearing signals can be adapted for a reference output device, can be in the form of device-specific code values or can require further adjustment to become device specific code values. Such adjustment may be accomplished by further matrix transformation or 1-dimensional look-up table transformation, or a combination of such transformations to properly prepare the output image-bearing signals for any of the steps of transmitting, storing, printing, or displaying them using the specified device. The output image is then delivered either electronically or by conveying a disk, printed image or other output.

Besides digital manipulation, the digital images can be used to change physical characteristics of the image, such as "windowing" and "leveling" (used in computed tomography scanning) or other manipulations known in the art.

Characteristics of Micro-lens and Micro-lens Arrays

In the foregoing discussion, the use of an array 40 of micro-lenses 42 has been generally described. The individual micro-lenses 42 of array 40 are convergent lenses in that they are shaped so as to cause light to converge or be focused. As such, they form convex projections from the film base. The individual projections are shaped as portions of perfect or imperfect spheres. Accordingly, the micro-lenses can be spherical portion lenses or they can be aspherical portion lenses or both types of micro-lenses can be simultaneously employed. A spherical portion micro-lens has the shape and cross-section of a portion of a sphere. An aspherical portion micro-lens has a shape and cross-section of a flattened or elongated sphere. The lenses are micro in the sense that they have a circular or nearly circular projection with a diameter of between 1 and 1000 microns. A cylindrical portion micro-lens has the shape and cross-section of a portion of a cylinder. An acylindrical portion micro-lens has a shape and cross-section of a flattened or elongated cylinder. In particular, the forgoing discussion has generally presumed and described the use of the present invention in concert with a close packed cubic micro-lens array 40 of spherical micro-lenses 42. It will be appreciated that various configurations of micro-lenses 42 and micro-lens array 40 can be used. For example, FIG. 20 shows, conceptually, a micro-lens array 40, of micro-lenses 42 arranged in a uniform cubic close packed distribution pattern on a support 90. It will be appreciated that other array patterns can be used. For example, FIG. 20 shows an embodiment having an off-set square close packed array pattern. In another embodiment shown in FIG. 20 micro-lenses 42 are arranged in micro-lens array 40 having a hexagonal close packed array pattern. Micro-lens array 40 can also feature random distributions of micro-lenses 42. One embodiment of an array having a random distribution is shown in FIG. 20. As is also shown in FIG. 20, in still another embodiment, micro-lens array 40 can comprise an array of cylindrical or acylindrical micro-lenses 42.

Figure 21A:
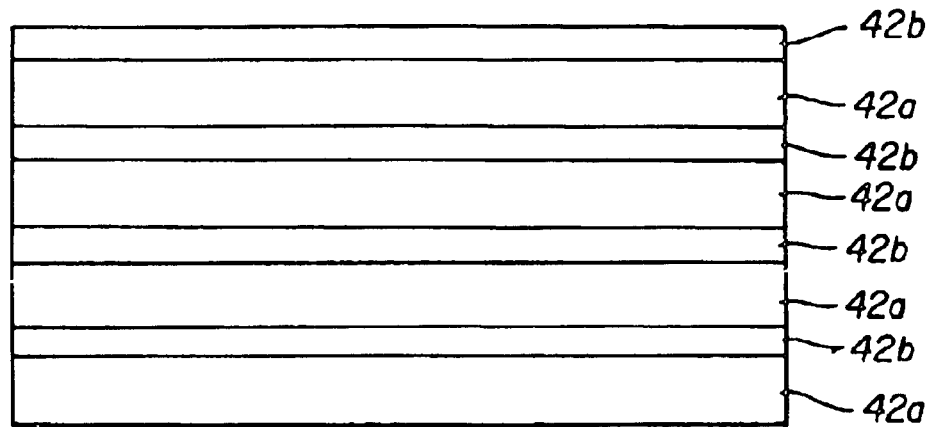
FIGS. 21a–21c illustrates various embodiments of arrays of different micro-lenses that can be usefully combined in a single array of micro-lenses.
Figure 21B:
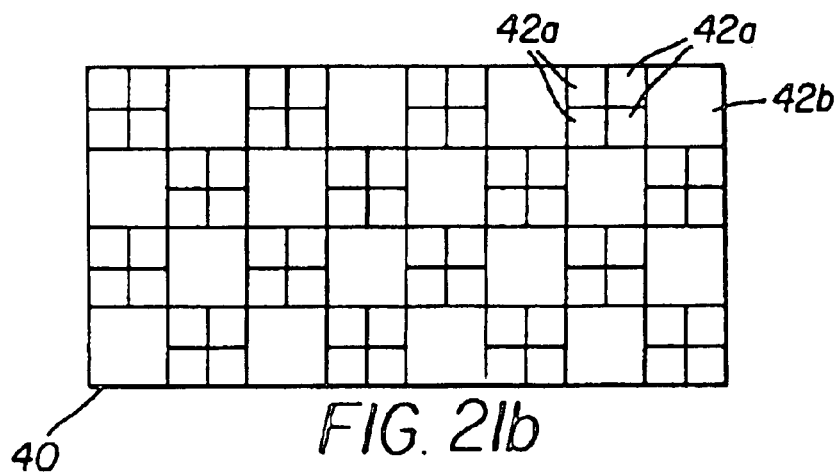
Figure 21C:
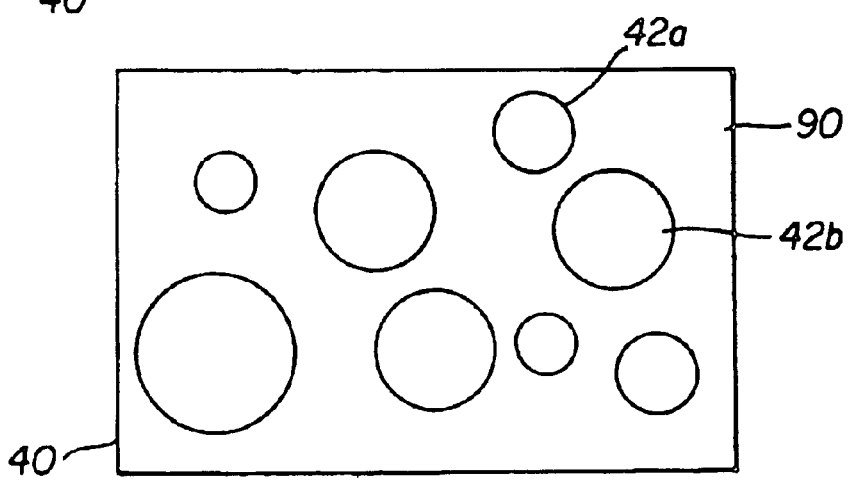
Figure 21D:
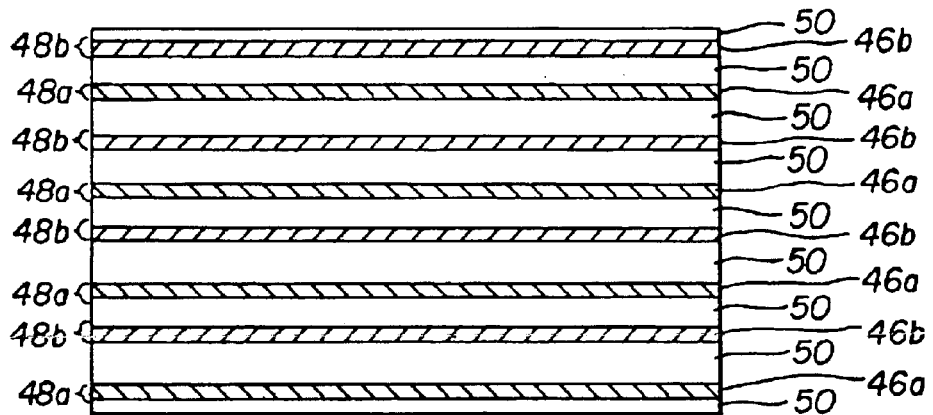
FIGS. 21d–21f illustrate patterns recorded on a photosensitive element by imagewise exposure of the photosensitive element to light from a scene passing through, respectively, the arrays of FIGS. 20a–20c.
Figure 21E:
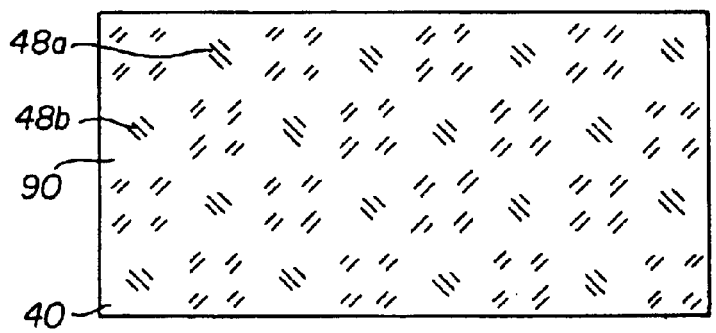
Figure 21F:
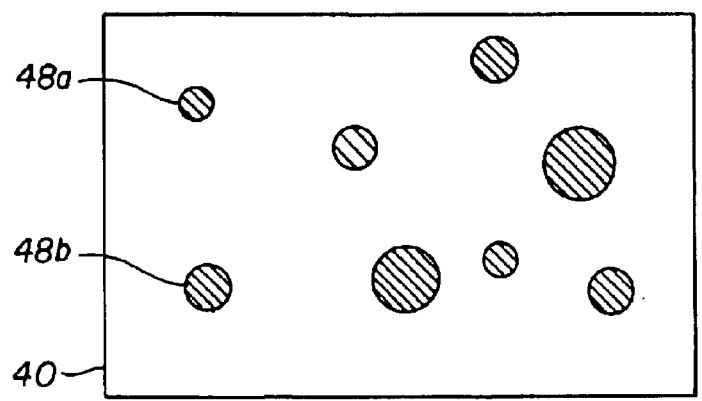

As is shown in FIGS. 21a, 21b and 21c, micro-lens array 40 can comprise micro-lenses 42 having different optical characteristics. In the embodiment of FIG. 21a, a micro-lens array 40 of cylindrical micro-lenses 42 is shown. As is shown in FIG. 21a, micro-lens array 40 has a first set of micro-lenses 42a that have a greater cross-section area than a second set of micro-lenses 42b also provided by micro-lens array 40. In this embodiment, the first set of micro-lenses 42a concentrate a greater portion of light during an exposure than micro-lenses 42b. Thus, the first set of micro-lenses 42a form a line image exposure on photosensitive element 30 as shown in FIG. 21d, in a first set of concentrated image areas 48a, when the amount of the light during the exposure is within a first exposure range 84. When a light from the scene within a second exposure range 86, the second set of micro-lens array 40b form a line image on photosensitive element 30 in a second set of concentrated image areas 48b. Light that is not concentrated by either set of micro-lenses 42a and 42b can form a residual image (not shown) in second exposure area 50 of photosensitive element 30 of FIG. 21a. Similarly, FIGS. 21b and 21c each show the use of a micro-lens array 40 having differently sized sets of micro-lenses 42a and 42b with the micro-lens array 40a concentrating light to form an exposure and directing that light onto concentrated image areas 48a on photosensitive element 30 when light from scene 24 is within a first range. Micro-lenses 40b concentrate light from a scene and direct this light onto concentrated image areas 48b on photosensitive element 30 to form an exposure when the light from the scene is within a second range. Here too, residual portions of the light are recorded in residual exposure areas 50 of photosensitive element 30. Thus, in these embodiments of FIGS. 21a–21c, the effective sensitivity of the photosensitive element 30 can be further extended. As is shown in FIG. 21c, the surface coverage of micro-lenses 40 does not have to be maximized. While any useful surface coverage of micro-lenses 40 can be employed, the ratio of the projected area of the micro-lenses 40 to the projected area of the photographic or photosensitive element 30, can be at least 20 percent. In one embodiment, the coverage can be between at least 50 percent and up to 85 percent. In another embodiment, surface coverage of 85 percent up to the close-packed limit can be used. The precise degree of surface coverage can be adjusted to enable varying levels of exposure sensitivity while maintaining useful photographic graininess and sharpness. In any embodiment where the surface coverage is less than the close packed limit, support 90 can be defined to allow residual light to strike photosensitive element 30.

Micro-lens array 40 can comprise a set of individual micro-lenses 42 that are formed together or joined together, for example by extrusion, injection molding and other conventional fabrication techniques known to those in the art. Micro-lens array 40 can also be formed by combining a plurality of separate micro-lenses 42 fixed together by mechanical or chemical means or by mounting on support 90. Micro-lens array 40 can comprise a set of lenticular beads or spheres (not shown) that are positioned proximate to or coated onto photosensitive element 30 or otherwise joined to photosensitive element 30. The micro-lenses 42 may be formed in any matter known in the microstructure art. These micro-lenses 42 may be unitary with photosensitive element 30, as for example by being embossed directly into photosensitive element 30 at manufacture or they may be integral to a distinct layer applied to photosensitive element 30. In still other embodiments, a micro-lens array 40 can be formed using a photosensitive coating.

Figure 22A:
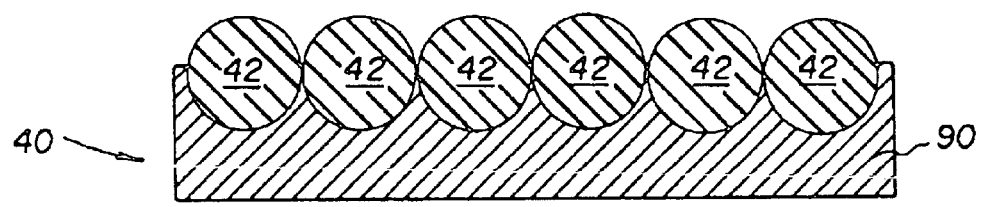
FIGS. 22a–22c illustrate of arrays of micro-lenses, spherical and aspherical lenses.
Figure 22B:
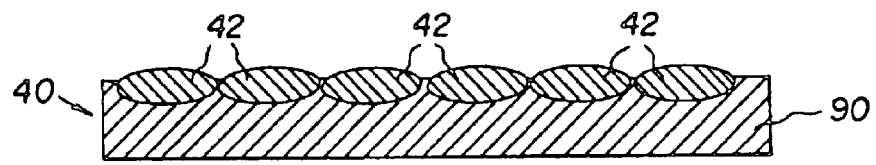
Figure 22C:
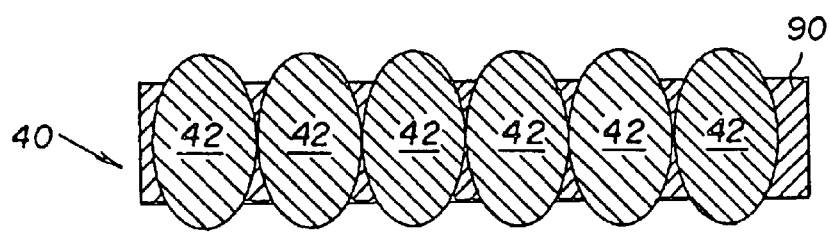

FIGS. 22a–22c shows a cross-sectional view of micro-lenses 42 mounted in a support 90 and exhibiting example embodiments of various spherical and aspherical micro-lenses 42. FIG. 22a shows an embodiment wherein micro-lenses 42 comprise spherical lenses joined by support 90. FIGS. 22a and 22c show embodiments of micro-lens array 40 having spherical micro-lenses 42. It is appreciated that any of the above described array patterns may be combined with aspherical micro-lenses 42 to provide extended sensitivity. Further, any of the patterns of micro-lenses 42 can be applied in a non-close packed manner to enable extended photographic sensitivity The micro-lenses 42 are shown with distinct hatching to illustrate the spherical and aspherical character of the protruding portion that actually forms the micro-lens. Aspherical micro-lenses 42, of the type shown in FIGS. 21b and 21c, are especially useful for this application in that the variable radius of such lenses allows for control of the lens focal length and lens aperture nearly independently of the spacing between the micro-lenses and the light sensitive layers. While these cross-sections have been described as spherical or aspherical, it is fully appreciated that the diagrams equally represent in cross-section cylindrical or acylindrical micro-lenses 42.

The light concentration or useful photographic speed gain on concentrating light focused by taking lens system 22 with a circular projection micro-lens 42 is the square of the ratio of f-numbers of the camera 20 and the micro-lenses 42. Speed gain (in log relative Exposure) in such a system can be determined as the speed gain equals 2×log (camera lens f-number/micro-lens f-number). The light concentration or useful photographic speed gain of cylindrical micro-lenses allow only the square root of such an improvement because they concentrate light in only one direction. The concentration of light by micro-lens array 40 enables both a system speed gain and forms an exposure pattern on the light sensitive material.

The dimensions of camera 20 and the detailed characteristics of the taking lens system 22 dictate the exposure pupil to image distance, i.e. the operating camera focal length. Preferably, image 24' is formed at the micro-lens array 40 of micro-lenses 42. The characteristics of micro-lenses 40 dictate their focal length. The micro-lens images are formed at the light sensitive layers of photosensitive element 30. The f-number of camera taking lens system 22 controls the depth-of-focus and depth-of-field of camera 20 while the micro-lens f-number controls the effective aperture of camera 20. By using a stopped down f-number for the camera lens, excellent sharpness along with wide depth of focus and depth of field are obtained. By using an opened f-number for micro-lens array 40, high system speed is obtained with emulsions that are typically thought of as "slow." This extra speed allows available light photography without the thermal and radiation instability typically associated with "fast" emulsions.

Accordingly, a useful combination of camera taking lens 22 and micro-lenses 42 f-numbers will be those that enable system speed gains. System speed gains of more than 0.15 log E, or ½-stop, are useful, while system speed gains 0.5 log E or more are preferred. While any micro-lenses 42 having an f-number that enables a speed gain with a camera taking lens 22 having adequate depth-of-field for an intended purpose can be gainfully employed, typically micro-lenses 42 having f-numbers of 1.5 to 16 are useful. In certain embodiments, micro-lenses 42 having f-numbers in the range of f/2 to f/7 are useful. In other embodiments, micro-lenses 42 having f-numbers in the range of f/3 to f/6 are preferred.

When the spatial relationship between the individual micro-lenses and the light sensitive layers of a film are maintained through photo-processing, as is the case with a photo-support having micro-lenses, both the pupils of the micro-lenses and their NA are maintained. However, when a distinct lenticular array is employed in taking and projection, then an additional constraint is encountered in obtaining a working system. This latter situation can arise for example when a camera with a mounted lenticular array is used in conjunction with a printer or scanner with a mounted lenticular array. Alternatively, it can arise when a film having a lenticular array that is altered or destroyed during photo-processing is used in conjunction with a printer or scanner with a mounted lenticular array. In these situations, the condition for projecting only light passed through dots and not from surrounding areas is that the pattern, number and micro-lens power be maintained and that the numerical aperture of the projection system does not exceed the micro-image numerical aperture. The condition for projecting light passing through the dot and the surrounding area is that the pattern, number, and micro-lens power be maintained and that the numerical aperture of the projection system is matched to the micro-lens numerical aperture. The condition for projecting only light passing through the surrounding areas and not through the dots is that the pattern, number, and micro-lens power be maintained and that the aperture of the projection system is a composite aperture obtained by adding micro-lens numerical aperture to an inverted micro-image numerical aperture.

For a dot pattern, the micro-image NA for a particular micro-lens is derived from the dot radius and the micro-lens focal lengths. Parallel equations apply to line patterns.

Micro-image NA=$\sin \theta$ and where $\tan \theta$=image dot radius divided by the corresponding micro-lens focal length.

Preferred design parameters for micro-lenses 42 and their relationship to the light sensitive layers of a photosensitive element 30 follow from these definitions:

Micro-lens radius is the radius of curvature of the hemispheric protrusion of micro-lenses 42. For aspherical micro-lenses 42 this value varies across the surface of the micro-lens.

Micro-lens aperture is the cross sectional area formed by the micro-lens typically described as a diameter. For spherical micro-lenses this diameter is perforce less than or equal to twice the micro-lens radius. For aspherical micro-lenses this diameter can be greater than twice the smallest radius encountered in the micro-lens. Use of differently sized micro-lenses having distinct apertures enables distinct levels of speed gain on a micro-scale and thus enables extended exposure sensitivity for a photographic layer.

Micro-lens numerical aperture=$\sin \theta'$ and where $\tan \theta'$=micro-lens aperture radius (not radius of curvature) divided by micro-lens focal length.

Micro-lens focal length is the distance from micro-lenses 42 to photosensitive layers of photosensitive element 30. For micro-lenses 42 on the opposing side of a support relative to a light sensitive layer this is typically set to be about the thickness of the support. It is appreciated that use of micro-lenses enables distinct color records to be preferentially enhanced for sensitivity. This feature can be especially important in specific unbalanced lighting situations such as dim incandescent lighted interiors that are blue light poor and red light rich. For example, with systems intended for incandescent photography the micro-lenses can be focused on the film's blue sensitive layers thus providing a preferential speed boost to the color record and improved color balance. In other situations, other colors can be preferentially boosted.

Micro-lens f-number is the micro-lenses 42 aperture divided by the/micro-lens focal-length. For spherical micro-lenses 42, the desired micro-lens focal length can be used to define an appropriate micro-lens radius following a lens equation, thusly:

Micro-lens radius is the micro-lens focal-length times $(n_2-n_1)/n_2$; where $n_1$ is the refractive index of the material outside the micro-lens (typically air with a refractive index of unity) while $n_2$ is the refractive index of the micro-lens and any contiguous transmissive material e.g. (plastics as used in array support 90.) Photographically useful gelatin typically has a refractive index of 1.4 to 1.6). The ratio of the highest to the lowest refractive index can be between 0.8 and 1.2. In preferred embodiments the ratio is between 0.95 and 1.05. Following the known refractive indices of typical photographic system components, useful spherical micro-lenses will have a micro-lens focal length about 3 times the micro-lens radius $((n_2-n_1)/n_2 \sim \frac{1}{3})$. Non-integral micro-lenses 42 can be made from a wider variety of plastics and glasses. For micro-lenses 42 that are integrally formed on photosensitive element 30, superior optical properties are provided when the refractive index of the materials used to form a micro-lens, the photographic support and the vehicle for the light sensitive layers are as similar as possible. However, purposeful mismatches in refractive index can facilitated light scatter and reflection and thereby influence the extent of residual image 54 formation.

Accordingly, micro-lenses 42 formed on a flexible photographic substrate 34 suitable for use in roll type photosensitive element 30 and located on the opposing side of the support from light sensitive layers will have a useful radius defined by the thickness of substrate 34. Preferred flexible substrates 34 are between about 60 and 180 microns thick. In this context, it is appreciated that aspherical micro-lenses 42 enable a greater degree of design flexibility in adjusting micro-lens aperture and focal length to the other requirements of photographic supports. In an alternative embodiment, shorter focal length micro-lenses 42 can be employed on the emulsion side of the supports where the micro-lenses 42 are located on the same side of a supports as the light sensitive layers and further from the support than the light sensitive layers. The desired focal length here would then be dictated by the thickness of any intervening layers. When there are intervening layers, they can be on the order of 1 to 50 microns or more in thickness. In the embodiment of FIG. 1, the micro-lens array 40 of micro-lenses 42 is separate from photosensitive element 30 and is separately mounted in camera 20 between camera taking lens system 22 and gate 26. In this embodiment, the focal length is dictated by the differences in refractive index between the micro-lens material and the surrounding medium, typically air and the micro-lens radius of curvature. Additional details can be found in the cross-referenced, co-filed and commonly assigned U.S. Patent application, the disclosures of which are incorporated by reference.

While any useful number of micro-lenses 42 can be employed per image frame to achieve the desired results, it is recognized that the actual number to be employed in any specific configuration depends on the configuration. For example, when a desired micro-lens focal length is fixed by forming integral micro-lenses 42 on the support side of a photographic material and the micro-lens f-number is fixed by the desired system speed gain for the combined lens system, micro-lens apertures or pitches of 10 to 100 microns can be encountered. So, a 135-format frame, roughly 24 by 36 mm in extent, can have between about 86thousand and 8.6 million micro-lenses at full surface coverage. Emulsion side micro-lenses, with their shorter focal-length can have useful apertures or pitches between about 3 and 30 microns which means roughly 960 thousand to 96 million micro-lenses 42 per 135-format frame at full surface coverage. Camera mounted micro-lenses 42 with their greater freedom in focal lengths can range up to 500 microns or even larger in aperture or pitch.

Light from the scene can be passed through more than one array of micro-lenses 40. For example, light from the scene can be passed through a first micro-lens array having hemicylindrical micro-lenses arrayed along a horizontal axis and then passing this compressed light through a second micro-lens array having hem-cylindrical micro-lenses arrayed along a vertical axis. This technique can be usefully employed to cause bi-axial concentration of the light from the scene.

Several specific system combinations are described. All are of the optical reconstruction with field lens type. Of course, any scanned image is potentially subject to digital reconstruction, as for example, when a film is employed and the film itself or the film as exposed is benefited by digital enhancement independent of any influence of a micro-lens.

Parts List 20 camera
21 camera body
22 taking lens system
23 aperture
24 scene
24' image of scene
26 gate
27 shutter system
30 photosensitive element
32 photosensitive layer
34 substrate
36 imaging area
38 photoprocessed element
40 micro-lens array
42 micro-lenses
44 concentrated fraction
45 optical axis
46 residual fraction
47 expected image areas
48 concentrated image areas
49 intersection of optical axis and photosensitive element
50 residual image area
52 concentrated image elements
54 residual image
60 light sensor
62 controller
63 lens position detector
64 photosensitive element type sensor
66 communication head
70 scene luminance range
72 actual latitude of photosensitive element
74 lower response threshold
76 upper response threshold
78 latitude desired for photographic element
80 lower response threshold of desired latitude
82 upper response threshold of desired latitude
84 first exposure range
86 second exposure range
90 support
100 optical system
101 optical axis
103 optical components $L_1$
105 optical components $L_2$
107 diaphragm
109 plane
111 plane
113 prolongation of parallel image rays
115 prolongation of focused rays
300 photosensitive element step
302 fractured light into concentrated and residual portions step
304 photoprocess exposed photosensitive element step
306 decompress step
308 adapting step
310 process recovered image step
312 deliver image step
350 reader device
351 optical system
352 photoprocessed element
354 light source
356 micro-lens array
358 lens
360 projected image
361 imaging plane
362 projection lens system
400 camera
401 scene
403 silver halide film
405 lens
407 optical axis
409 solid state imager
410 micro-lenses
411 scanner lens
415 field lens
417 optical element
419 scanner lens system
420 scanning apparatus
421 exposed and photoprocessed lenticular film
423 light source
701 camera
703 lens
705 scene
707 micro-lens array
709 exposure light path
711 conventional film
713 reader
714 light source
715 light
716 reader light path
717 photoprocessed film
719 micro-lens array
721 field lens
723 projection lens
725 reading plane
801 camera
803 lens
805 scene
807 micro-lens array 809 exposure light path
811 film
813 reader
814 light source
815 light
816 reader light path
817 photoprocessed film
819 micro-lens array
821 field lens
823 projection lens
825 reading plane
901 camera
903 lens
905 scene
909 exposure light path
911 film
912 micro-lens array
913 reader
914 light source
915 light
916 reader light path
917 processed film
919 micro-lens array
921 field lens
923 projection lens
925 reading plane
1001 camera
1003 lens
1005 scene
1009 exposure light path
1011 film
1012 micro-lens array
1013 reader
1014 light source
1015 reader light path
1017 processed film
1021 field lens
1023 projection
1025 reading plane
1101 camera
1103 lens
1105 scene
1109 exposure light path
1111 film
1112 micro-lens array
1113 reader
1114 light source
1115 light
1116 reader light path
1117 processed film
1119 micro-lens array
1123 field lens
1123 projection lens
1125 reading plane
1201 camera
1203 lens
1205 scene
1209 light path
1211 film
1212 micro-lens array
1213 reader
1214 light source
1215 light
1217 processed film
1221 field lens
1223 projection lens
1225 reading plane
1301 camera
1303 lens
1305 scene
1309 light path
1311 film
1312 micro-lens array
1313 reader
1314 light source
1315 light
1317 processed film
1323 projection lens
1325 reading plane
1401 data reader
1403 adjustable field lens
1405 means of adjusting adjustable field lens
1950 photoprocessed element
1952 concentrated image element
1954 residual image
2002 inverse aperture
2004 opaque stop
2006 annular area
2008 central opaque stop
2013 reader
2019 micro-lens array
2021 field lens
2023 projection lens system
2050 exposed photosensitive element step
2052 fractured light into concentrated and residual portions
2054 photoprocessed photosensitive elements
2056 decompress image recorded on photosensitive element
2058 decompress step
2060 adapting step
2062 filter step
2064 image process step
2100 reading device
2102 light path
2105 optical system
2110 lens system
2120 field lens
2125 array of micro-lenses
2130 inverse aperture
2140 detector
2144 scanner
2145 scanner controller
2145 analog to digital converter
2148 digital signal processor
2150 storage device
2152 display
2154 network interface
2156 photosensitive element recorder
2158 image recorder
2160 memory
2162 electronic interface
2164 magnetic disk
2166 magnetic writer
2168 optical disk
2170 optical writer
2172 print media
2174 printer
$P_c$ exit pupil
$P_i$ entrance pupil
R principal parallel ray
$R_a$ peripheral parallel ray
$R_b$ peripheral parallel ray
R' focused principal ray
$R_a$' focused peripheral ray
$R_b$' focused peripheral ray

What is claimed is:

1. A method for using a photosensitive element that is photosensitive to light within a predetermined range of exposure levels to capture images including exposure levels that are outside of the predetermined range of exposure levels, the method comprising the steps of:

exposing the photosensitive element to light from a scene;

fracturing the light from the scene into concentrated an residual portions with the concentrated portions being directed to form a pattern of concentrated image elements on the photosensitive element when light from the scene is within a first exposure range with the residual portion of the light being directed to form a residual image when light from the scene is within a second exposure range; and adapting light from the scene so that the pattern of concentrated image elements is formed in a predefined pattern of concentrated image areas on the photosensitive element.

2. The method of claim 1 wherein light from the scene is adapted by passing the light from the scene through a field lens.

3. The method of claim 1, wherein the step f exposing the photosensitive element to light from a scene comprises passing light from the scene through a taking lens system having an exit pupil.

4. The method of claim 3, wherein the step of adapting light from the scene comprises positioning a field lens between the taking g lens system and the photosensitive element so that the pattern concentrated image elements is formed within the pattern of concentrated image areas of the photosensitive element.

5. The method of claim 3, wherein the step of adapting the light from the scene comprises the steps of determining the spatial and angular relationship between the entrance pupil of the taking lens system and the photosensitive element and the positioning a field lens between the taking lens and the photosensitive element so that the pattern of concentrated image elements is formed within the pattern of concentrated image areas of the photosensitive element.

6. The method of claim 3, wherein a field lens is interposed between the scene and the array of micro-lenses and the step of adapting the light from the scene comprises adjusting the optical characteristics of the field lens so that the pattern of concentrated image elements is formed within the concentrated image element areas.

7. The method of claim 1, wherein the step of fracturing the light from the scene comprises passing light from the scene through a micro-lens array.

8. The method of claim 1, further comprising the steps of photoprocessing the photosensitive element to farm a photoprocess element and recovering an output image from at least one or the pattern of concentrated image elements and the residual image.

9. The method of claim 8, wherein the step of recovering an output image from at least one of the pattern of concentrated image elements and the residual image comprises recovering an output image from the pattern of concentrated image elements by decompressing a light modulated by the pattern of concentrated image elements and focusing the decompressed light at an imaging plane.

10. The method of claim 9, wherein the step of fracturing the light from the scene comprises passing the light from the scene through an array of micro-lenses and wherein the step of decompressing a light modulated by the pattern of concentrated image elements comprises passing the modulated light through a micro-lens array that marches the array of micro-lenses used to fracture the light from the scene.

11. The method of claim 10, wherein the step of decompressing the light from the scene comprises using the micro-lens array used to fracture light from the scene to decompress the light modulated by the pattern of concentrated image elements.

12. The method of claim 9, further comprising the step of supplying decompressed light to an entrance pupil of a reader lens system which focuses the supplied light onto an imaging surface.

13. The method of claim 12, further comprising the step of readjusting the decompressed light and adapting the decompressed light so that the spatial and angular relationship between the entrance pupil of the reader lens system and the pattern of concentrated image elements formed on he photoprocessed photosensitive element is optically matched to the spatial and angular relationship between the exit pupil of the taking lens system an the pattern of concentrated image elements formed on photosensitive element.

14. The method of claim 9, wherein the step of recovering an output image from at least one of the pattern of concentrated image elements and the residual image comprises the steps of modulating a light with the pattern of concentrated image elements and the residual image and filtering the modulated light to form an output image having only light modulated by the residual image.

15. A method for forming an output image from a photoprocessed photosensitive element having at least one pattern of concentrated image elements displaced from a predefined pattern of concentrated image areas, the method comprising the steps of:

modulating by the photoprocessed photosensitive element;

decompressing the modulated light to extract an image from light modulated by a predefined pattern of concentrated image elements;

adapting the decompressed image so that the decompressed modulated light forms a decompressed image having the appearance of an image formed from the pattern of concentrated image elements that are placed within the predefined pattern of concentrated image areas; and focusing the decompressed image at an imaging plane.

16. The method of claim 15, wherein decompressing step comprises passing the modulated light through a micro-lens array.

17. The method of claim 15, wherein the photoprocessed photosensitive element has an array of micro-lenses thereon and the step of decompressing the modulated light comprises passing the modulated light the micro-lens array used to fracture light from the scene to decompress the light modulated by the pattern of concentrated image elements.

18. The method of claim 15, further comprising the step of supplying decompressed light to an entrance pupil of a reader lens system which focuses the supplied light onto an imaging surface.

19. The method of claim 15, further comprising the step of adapting the decompressed light so that the spatial and angular relationship between an entrance pupil of a reader lens system and the pattern of concentrated image elements formed on the photoprocessed photosensitive element is optically matched to the partial and angular relationship between an exit pupil of the taking lens system and the pattern of concentrated image elements formed on the photosensitive element.

20. The method of claim 15, further comprising the step of modulating a light with the pattern of concentrated image elements within a residual image and filtering out light modulated by the concentrated image elements to form an image at the imaging plane using light modulated by the residual image.

21. The method of claim 20, wherein the filtering process comprises the step of passing the light modulated by the residual image through an annular aperture of an inverse aperture stop.

22. A camera for forming at least one image on a photosensitive element that is photosensitive to light within a predetermined range of exposure levels to capture images including exposure levels that are outside of the predetermined range of exposure levels; the camera comprising:
   a gate positioning the photosensitive element;
   a taking lens unit for focusing light from the scene at the photosensitive element;
   a shutter to controllably expose the photosensitive element to light from the scene;
   an array of micro-lenses positioned between the field lens and the photosensitive element, with the array of micro-lenses directing a first portion of light from the scene to form a pattern of concentrated image elements on the photosensitive element when the exposure includes light that is within a first range of exposure levels and with the array of micro-lenses permitting a second portion of light from the scene to pass to the photosensitive element an form a residual image surrounding the concentrated image elements when light from the scene is within a second range of exposure levels, herein the combination of the first range of exposure and the second range of exposure levels is greater than the predefined range of exposure levels; and
   a field lens disposed between the taking lens unit and the array of micro-lenses, with the field lens adapting light from the scene so that the pattern of concentrated image elements is formed in a predefined pattern of concentrated image areas on the photosensitive element.

23. The camera of claim 22, wherein the optical characteristics of the field lens are adjusted.

24. The camera of claim 22, wherein said field lens is selectively positioned to adapt the light from the scene to conform the pattern of concentrated image elements formed on the photosensitive element to pattern of concentrated images formed by a camera having a taking lens system with an exit pupil having a predetermined spatial and angular relationship with the photosensitive element and micro-lens array.

25. The camera of claim 22, wherein the position of the exit pupil of the taking lens relative to the micro-lens array and the photosensitive element can vary and the field lens is adjusted so that for every position of the exit pupil, the pattern of concentrated image elements formed on the photosensitive element remains within the predefined pattern of concentrated image element areas.

26. The camera of claim 22, wherein the camera further comprises an optical detector for detecting the optical characteristics of the taking lens unit that are indicative of the position of the exit pupil of the taking lens system.

27. The camera of claim 22, wherein the camera further comprises a data recorder for recording a signal on the photosensitive element that is indicative of the position of the exit pupil of the taking lens system.

28. The camera of claim 27, wherein the camera further comprises a controller for receiving the detected optical characteristics and a field lens positioning means for positioning the field lens as a function of the detected optical characteristics.

29. The camera of claim 27, wherein the camera further comprises a controller for receiving the detected optical characteristics and a field lens setting means for setting the optical of the field lens.

30. The camera of claim 22, wherein said micro-lens array is joined to the photosensitive element.

31. A reader apparatus for forming an output image using a photoprocessed photosensitive element having at least one of a pattern of concentrated image elements and a residual image recorded thereon, the apparatus comprising:
   a light source radiating light;
   a gate positioning the photoprocess photosensitive element to modulate light radiated by the light source;
   a micro-lens array adapted to decompress light modulated by a predetermined pattern of concentrated image element areas on the photoprocessed photosensitive element, said predetermined pattern differing from the pattern actually formed on the photoprocessed photosensitive element;
   a lens unit receiving the decompressed light and forming an output image at an imaging plane; and,
   a field lens between the array of micro-lenses and the lens unit, with the field lens adapting the decompressed light so that the output image contains an image that is based upon the pattern of concentrated image elements actually formed on the photosensitive element.

32. The reader apparatus of claim 31, wherein the reader further comprises a detector for detecting a signal indicative of the pattern formed on the photoprocessed photosensitive element and a controller for interpreting the signal and controllably adjusting the field lens.

33. The reader apparatus of claim 31, wherein the reader is adapted to optically scan the film to identify the pattern of concentrated image elements recorded thereon and to adjust the field lens in accordance with the concentrated image elements.

34. The reader apparatus of claim 31, further comprising an optical filter between the micro-lens array and the lens unit, the optical filter blocking light modulated by the concentrated image elements and passing light modulated by the residual image so the image formed by the lens unit comprises the residual image.

35. The reader apparatus of claim 34, wherein the optical filter comprises an inverse aperture.

36. The reader apparatus of claim 35, wherein the inverse aperture comprises a set of annular optical paths, with a central circular section, a first annular ring surrounding the central circular section and a second annular ring surrounding the first annular ring, wherein said central circular section is opaque to block light modulated by the compressed image areas, the first annular section comprises a transparent area that passes light modulated by the residual image area and the second annular ring is opaque to block light modulated by the compressed image areas.

37. The reader apparatus of claim 34, wherein the reader further comprises a detector for detecting a signal indicative of the pattern formed on the photoprocessed photosensitive element and a controller for interpreting the signal and the optical filter is interposed in between the micro-lens array and the lens unit when such signal is received and removed when the signal is not received.

38. The reader apparatus of claim 34, wherein the reader has an optical scanner adapted to examine the images recorded on the photoprocessed photosensitive element to detect when a residual image is recorded on the photoprocessed photosensitive element and to filter the light modulated by the concentrated image elements when a residual image is recorded on the photoprocessed photosensitive element.

39. A camera for capturing at least two images on a photosensitive element that is photosensitive to light within a predetermined range of exposure levels, the camera comprising:

a lens means for focusing light from a scene at an imaging plane, an exposure control means for controllably allowing light from a scene to strike the photosensitive element for a period of time to define an exposure;

an array of micro-lenses adapted to focus a portion of the light from the scene during an exposure to form a concentrated light image of the scene during the exposure comprising a pattern of concentrated image elements formed on first portions of the photosensitive element and to allow a residual portion of light from the scene during an exposure to pass through the array of micro-lenses to form a residual image of the scene on second portions of the photosensitive element; and a means for adapting light from the scene so that the pattern of concentrated image elements is formed in a predefined pattern of concentrated image areas on the photosensitive element;

wherein the concentrated light image contains a differentiable image where the light received during the exposure is within a range of exposure levels that is at least in part below the range of exposure levels to which the concentrated image element is photosensitive and wherein the residual image contains a differentiable image where the light received during the exposure is within range of exposure levels that is at least in part below the range of exposure levels to which the photosensitive element is photosensitive.

* * * * *

UNITED STATES PATENT AND TRADEMARK OFFICE
CERTIFICATE OF CORRECTION

PATENT NO. : 6,868,231 B2
DATED : March 15, 2005
INVENTOR(S) : Lyn M. Irving et al.

It is certified that error appears in the above-identified patent and that said Letters Patent is hereby corrected as shown below:

Column 35,
Line 8, replace "an" with -- and --
Line 23, replace "f" with -- of --
Line 29, after "taking", delete "g"
Line 51, replace "farm a photoprocess" with -- form a photoprocessed --
Line 53, replace "or" with -- of --
Line 66, replace "marches" with -- matches --

Column 36,
Line 15, replace "he" with -- the --
Line 17, replace "an" with -- and --
Line 18, after "on", insert -- the --

Column 37,
Line 27, replace "an" with -- and --
Line 30, replace "herein" with -- wherein --
Line 44, after "to" insert -- a --

Column 38,
Line 4, after "optical", insert -- characteristics --
Line 12, replace "photoprocess" with -- photoprocessed --

Signed and Sealed this

Ninth Day of August, 2005

JON W. DUDAS
*Director of the United States Patent and Trademark Office*